United States Patent
Merg et al.

(10) Patent No.: US 9,704,141 B2
(45) Date of Patent: Jul. 11, 2017

(54) POST-REPAIR DATA COMPARISON

(71) Applicant: Snap-on Incorporated, Kenosha, WI (US)

(72) Inventors: Patrick S. Merg, Hollister, CA (US); Jacob G. Foreman, San Jose, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/933,949

(22) Filed: Nov. 5, 2015

(65) Prior Publication Data

US 2017/0132578 A1 May 11, 2017

(51) Int. Cl.
- *G06Q 10/00* (2012.01)
- *G07C 5/00* (2006.01)
- *G06F 17/30* (2006.01)

(52) U.S. Cl.
CPC ....... *G06Q 10/20* (2013.01); *G06F 17/30598* (2013.01); *G07C 5/00* (2013.01)

(58) Field of Classification Search
None
See application file for complete search history.

(56) References Cited

U.S. PATENT DOCUMENTS

| | | |
|---|---|---|
| 5,299,550 A | 4/1994 | Inoue |
| 5,520,160 A | 5/1996 | Aota et al. |
| 6,560,516 B1 | 5/2003 | Baird et al. |
| 6,768,935 B1 | 7/2004 | Morgan et al. |
| 6,850,071 B1 | 2/2005 | Pederson et al. |
| 7,155,636 B2 * | 12/2006 | Nagata ............ G11B 20/18 714/4.3 |

(Continued)

FOREIGN PATENT DOCUMENTS

EP    1 596 176    8/2005

OTHER PUBLICATIONS

Auterra, LLC, "DashDyno SPD Automotive Computer", available at www.auterraweb.conn/ (last visited Feb. 21, 2011).

(Continued)

*Primary Examiner* — Yonel Beaulieu
*Assistant Examiner* — Krishnan Ramesh
(74) *Attorney, Agent, or Firm* — McDonnell Boehnen Hulbert & Berghoff LLP

(57) ABSTRACT

Methods and apparatus are provided for repairing vehicles. A computing device can receive post-repair data regarding a first vehicle. The computing device can compare the post-repair data to a post-repair dataset regarding at least one vehicle other than the first vehicle. The post-repair dataset can include at least one of an instance of successful post-repair data and an instance of unsuccessful post-repair data. The computing device can determine that a repair to the first vehicle is successful if the post-repair dataset matches an instance of successful post-repair data of the post-repair dataset. The computing device can determine that the repair to the first vehicle is unsuccessful if the post-repair dataset matches an instance of unsuccessful post-repair data within the post-repair dataset. The computing device can indicate whether the repair is successful or unsuccessful.

22 Claims, 13 Drawing Sheets

(56) References Cited

U.S. PATENT DOCUMENTS

| | | | |
|---|---|---|---|
| 7,206,771 B2 * | 4/2007 | Alvarez | G06Q 10/06 701/31.4 |
| 7,209,860 B2 | 4/2007 | Trsar et al. | |
| 7,487,018 B2 * | 2/2009 | Afshar | G06Q 10/06 701/29.6 |
| 7,487,035 B2 | 2/2009 | Nozawa et al. | |
| 7,542,832 B2 | 6/2009 | Nou | |
| 7,739,007 B2 | 6/2010 | Logsdon | |
| 7,801,671 B1 | 9/2010 | Pederson et al. | |
| 8,095,261 B2 | 1/2012 | Howell et al. | |
| 8,370,018 B2 | 2/2013 | Andreasen | |
| 8,494,706 B2 * | 7/2013 | McGaughey | F04B 17/03 324/503 |
| 8,620,511 B2 | 12/2013 | Rother | |
| 8,676,432 B2 * | 3/2014 | Patnaik | G06F 11/008 701/29.1 |
| 8,886,392 B1 * | 11/2014 | Maeng | G06Q 10/20 701/29.1 |
| 8,977,423 B2 | 3/2015 | Merg et al. | |
| 2002/0007237 A1 | 1/2002 | Phung et al. | |
| 2005/0102119 A1 * | 5/2005 | Alvarez | G06Q 10/06 702/183 |
| 2005/0149566 A1 | 7/2005 | Baek et al. | |
| 2006/0030981 A1 | 2/2006 | Robb et al. | |
| 2006/0031041 A1 * | 2/2006 | Afshar | G06Q 10/06 702/184 |
| 2006/0078175 A1 | 4/2006 | Brozovich | |
| 2006/0095230 A1 | 5/2006 | Grier et al. | |
| 2006/0142907 A1 | 6/2006 | Cancilla et al. | |
| 2008/0004764 A1 | 1/2008 | Chinnadurai et al. | |
| 2008/0110239 A1 | 5/2008 | Maegawa | |
| 2009/0216399 A1 * | 8/2009 | Ishikawa | G07C 5/008 701/31.4 |
| 2011/0172874 A1 * | 7/2011 | Patnaik | G06F 17/30548 701/31.4 |
| 2012/0215491 A1 | 8/2012 | Theriot et al. | |
| 2013/0046436 A1 * | 2/2013 | McGaughey | F04B 17/03 701/33.5 |
| 2013/0204485 A1 | 8/2013 | Chen et al. | |
| 2013/0231826 A1 | 9/2013 | Zhang et al. | |
| 2014/0207515 A1 | 7/2014 | Merg et al. | |
| 2014/0207771 A1 * | 7/2014 | Merg | G06Q 10/20 707/731 |
| 2014/0244213 A1 | 8/2014 | Theriot et al. | |
| 2015/0012169 A1 * | 1/2015 | Coard | G06Q 10/06316 701/29.1 |
| 2015/0046391 A1 | 2/2015 | Merg | |
| 2015/0066781 A1 * | 3/2015 | Johnson | G06Q 30/0206 705/305 |

OTHER PUBLICATIONS

Automotive Test Solutions, Inc. "EScan—Automotive Test Solutions", 2006, available at atsnm.com/escan.htm (last visited Feb. 21, 2011).

dealextreme.com, "ELM327 Bluetooth OBD-11 Transceiver Dongle", Oct. 22, 2008, available at www.dealextreme.com/p/elm327-bluetooth-obd-ii-wireless-transceiver-dongle-16921 (last visited Feb. 21, 2011).

International Preliminary Report on Patentability and Written Opinion for PCT Pat. App. No. PCT/US2012/025802, issued Aug. 21, 2013.

International Searching Authority, Invitation to Pay Additional Fees for PCT Pat. App. No. PCT/US2012/025802 mailed Jul. 11, 2012, 8 pages.

A.K. Jain et al.,"Statistical Pattern Recognition: A Review", IEEE Transactions on Pattern Analysis and Machine Intellgence, vol. 22, No. 1, Jan. 2000, pp. 4-37.

K. Layne, "Reading a Vacuum Gauge", Motor, Aug. 2001, pp. 47-50, available at www.motor.com/magazine/pdfs/082001_05.pdf (last visited Feb. 21, 2011).

C. Sankavaram et al., "Event-driven Data Mining Techniques for Automotive Fault Diagnosis", 21st International Workshop on Principles of Diagnosis, pp. 1-8 (Oct. 13-16, 2010).

Snap-On Inc., "Verdict User Manual", EAZ0063L05A Rev. A, Aug. 2010.

Wikipedia, "Expert System", Oct. 5, 2010, available at en.wikipedia.org/wiki/Expert_system (last visited Oct. 6, 2010).

Wikipedia, "Inference Engine", Jun. 21, 2010, available at en.wikipedia.org/wiki/Inference_engine (last visited Oct. 6, 2010).

Wikipedia, "Pearson product-moment correlation coefficient", Feb. 18, 2011, available at en.wikipedia.org/wiki/Pearson_product-moment_correlation_coefficient (last visited Feb. 21, 2011).

International Searching Authority, International Search Report and Written Opinion of the International Searching Authority for PCT Pat. App. No. PCT/US2016/06191, mailed Feb. 7, 2017.

* cited by examiner

POST-REPAIR DATA COMPARISON

BACKGROUND

Unless otherwise indicated herein, the materials described in this section are not prior art to the claims in this application and are not admitted to be prior art by inclusion in this section.

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston-ring compressors, and vehicle brake tools. The tools used by vehicle technicians may also include electronic tools such as a vehicle scan tool or a digital voltage-ohm meter (DVOM), for use diagnosing and/or repairing a vehicle.

The vehicle scan tool and/or DVOM can be linked via wired and/or wireless link(s) to other devices, perhaps to communicate data about the vehicle. The vehicle scan tool and/or DVOM can provide a significant amount of data to aid diagnosis and repair of the vehicle. Typically, the data does not include contextual data, such as historical information. Further, the data is typically formatted such that data interpretation by skilled personnel, such as a vehicle technician, is required before a problem with the vehicle can be identified, diagnosed, and/or repaired.

SUMMARY

In one aspect, a method is provided. A computing device receives first post-repair data regarding a first vehicle. The computing device compares the first post-repair data to a first set of post-repair data regarding at least one vehicle other than the first vehicle. The first set of post-repair data includes at least one of an instance of successful post-repair data and an instance of non-successful post-repair data. The computing device determines that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data. The computing device outputs an indication that the first repair is successful or non-successful.

In another aspect, a computing device is provided. The computing device includes a processor and a computer readable medium. The computer readable medium stores at least executable instructions. The executable instructions, when executed by the processor, cause the computing device to perform functions. The functions include: receiving first post-repair data regarding a first vehicle; comparing the first post-repair data to a first set of post-repair data regarding at least one vehicle other than the first vehicle, where the first set of post-repair data includes at least one of an instance of successful post-repair data and an instance of non-successful post-repair data; determining that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data; and outputting an indication that the first repair is successful or non-successful.

In another aspect, a computer readable medium is provided. The computer readable medium is configured to store at least executable instructions. The executable instructions, when executed by a processor of a computing device, cause the computing device to perform functions. The functions include: receiving first post-repair data regarding a first vehicle; comparing the first post-repair data to a first set of post-repair data regarding at least one vehicle other than the first vehicle, where the first set of post-repair data includes at least one of an instance of successful post-repair data and an instance of non-successful post-repair data; determining that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data; and outputting an indication that the first repair is successful or non-successful.

In another aspect, a server is provided. The server includes: means for receiving first post-repair data regarding a first vehicle; means for comparing the first post-repair data to a first set of post-repair data regarding at least one vehicle other than the first vehicle, where the first set of post-repair data includes at least one of an instance of successful post-repair data and an instance of non-successful post-repair data; means for determining that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data; and means for outputting an indication that the first repair is successful or non-successful.

DETAILED DESCRIPTION

Post Repair Data Comparison

Figure 1:
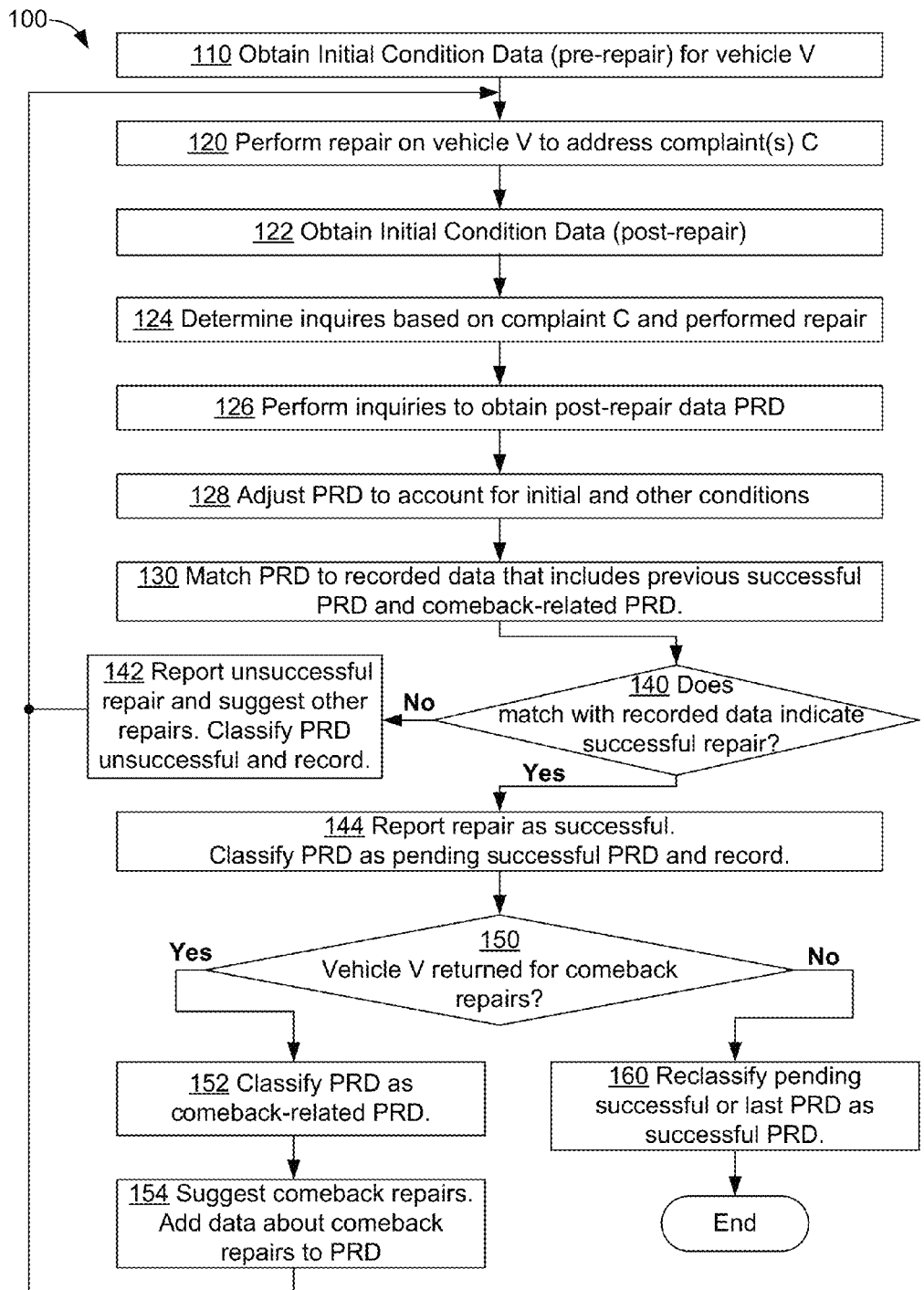
FIG. 1 is a flowchart of a method for comparing and classifying repair data, in accordance with an embodiment.

The herein-described systems relate to verifying success of repairs performed on a device-under-service, such as a vehicle. Once at least part of a repair is completed on a vehicle, a repair technician can use diagnostic equipment to request a post-repair data comparison. The diagnostic equipment can send data related to the repair to a server, or other computing device. The server can compare the repair-related data to previously-stored data about similar repairs and determine whether or not the repair is likely to be successful. If server determines the repair is not likely to be successful, the server can determine possible additional repairs to improve the likelihood of a successful repair. The server can then send a post-repair comparison report, including the likelihood of a successful repair and any possible additional repairs, to the diagnostic equipment. After a vehicle is considered to be repaired, the repair technician can then decide whether the repair is complete, or if additional repairs need to be performed, based in part on the post-repair comparison report.

The repair data can include data from on-board diagnostic systems, such as data provided from on-board diagnostics (OBD) systems within a device-under-service. Such data can be provided in accord with an OBD data protocol, such as an On-Board Diagnostic II ("OBD-II") protocol (e.g., SAE J1850, SAE J2284, ISO 9141-2, ISO 14230, ISO 15765). In an OBD-II protocol, a parameter ID (PID) is sent to the device-under-service, and the device-under-service responds with a value for the parameter referenced by the PID. These parameter values can be used to determine whether the device-under-service is operating correctly or not. In the context of a repair, parameter values indicating proper operation can be associated with (likely) successful repairs, while parameter values indicating improper operation can be associated with (likely) unsuccessful repairs.

The repair data can include data about the device-under-service and/or the repair. Examples of this data can include, but are not limited to, information about the device-under-service; e.g., manufacturer name, year of manufacture, model information; information about components of the device-under service; e.g., engine information, control unit information, age/manufacturer of components, a vehicle identification number (VIN), serial number, and/or other identifying number(s) associated with the vehicle, one or more license plate/registration numbers associated with the vehicle, information about the owner(s) of the vehicle; e.g., name(s), mailing address(es), electronic/e-mail addresses, credit card/financial information, and/or other information related to the vehicle, repair history information, information about the facility and/or technicians performing the repair, information about labor performed during a repair; e.g., labor codes and/or descriptions, and/or information about parts used during the repair; e.g., part codes/numbers used during the repair. Other types of repair data are possible as well.

Once obtained, the repair data can be provided to a server, which can attempt to match the repair data with recorded data about previous repairs. If the repair data matches data related to successful repairs, then the server can determine that the repair data likely indicates a successful repair. Otherwise, if the repair data matches data related to unsuccessful repairs, then the server can determine that the repair data likely indicates an unsuccessful repair. If the repair is determined to be unsuccessful, then the server can additionally provide suggestions for further repairs to increase the likelihood of a successful repair. After determining whether the repair data indicates a successful (or unsuccessful) repair, the server can provide a post-repair comparison report with an indication of a successful (or unsuccessful) repair and any suggested further repairs.

In some cases, a device-under-service leaves a repair facility after completion of a repair and later, a complaint that led to the completed repair resurfaces. For one example, suppose a customer complains that their vehicle failed a clean air test and wants their vehicle repaired so that the vehicle passes the clean air test. During a first repair, repairs are attempted to the vehicle to put the vehicle in condition to pass the clean air test. Sometime later, the vehicle is clean-air tested and fails again. Then, the vehicle can be brought back to the repair facility for a "comeback" repair; that is, a second repair to fix the original complaint (vehicle fails clean air test) that was not fixed.

As another example, suppose a tire of a vehicle has two punctures, and during a first repair, only one puncture is repaired. Sometime later, a person associated with the vehicle whose tire was repaired may notice that the tire is losing air, even though the repaired tire was supposedly fixed. Then, the vehicle can be brought back to the repair facility for a comeback to fix the original complaint (a punctured tire) that was partially fixed by the first repair. In some cases, comeback repairs are not charged by the repair facility, and so time and costs associated for the comeback repairs are absorbed by the repair facility. Further, comeback repairs can cause the person associated with the vehicle to waste time in scheduling and waiting for the second, comeback repair, possibly leading to some dissatisfaction with the repair facility.

To decrease the likelihood of further comeback repairs, the server can track repair data, in part, based on comeback status. For example, data for a first repair that is originally indicated to be successful can be reclassified as unsuccessful and/or associated with a comeback repair after the server receives data for a comeback repair associated with the first repair. Then, when later repair data for other devices-under-service is received, it can be compared with comeback-related data. If the later-received data then matches with comeback-related data, this match can be indicated as part of the post-repair comparison report.

Post-repair comparison can be used by service facilities to verify success of repairs, based on matching data from previous repairs, before a vehicle or other device-under-service leaves the service facility. Further, the herein-described post-repair comparison techniques utilize data specifically indicates as being from comeback repairs, thereby assisting service facilities to avoid comeback repairs. These techniques can increase the success of repair work, increase customer satisfaction with the repair facility, and assure the customer that repairs have been done correctly. Further, these techniques can reduce comeback-related expenses for the repair facility by reducing the number of comeback repairs.

Example System and Techniques for Post-Repair Data Comparison

FIG. 1 is a flowchart of method 100 for comparing and classifying repair data, in accordance with an embodiment. Part or all of method 100 can be carried out by a suitably programmed computing device, such as, but not limited to, server 300 discussed below in the context of at least FIGS. 3A and 4A-6.

Method 100 can begin at block 110, where initial condition data related to a vehicle V, representing a device-under-service, at the onset of a visit to a repair facility can be obtained. The initial condition data can include data from any pre-repair checks, observations, or tests run on the vehicle before any repairs are performed on the vehicle. Example initial condition data include, but are not limited to, data about electrical measurements such battery voltages, tire pressure data, PID data, data about engine operation, vehicle data, such as vehicle data 212 described in the context of FIG. 2A, complaint data, such as complaint data 214 described in the context of FIG. 2A, and/or data about other initial conditions/initial measurements made regarding vehicle V. For example, complaint C of vehicle V may indicate that the "check engine" light for vehicle V is on. In response, a repair technician can use an OBD scanner to read PIDs associated with parameters that caused the check engine light to be on as part of determining initial condition data. As another example, a repair facility may have a standard battery of tests, such as tire pressure checks, windshield washer operation verification, headlight/tail light/brake light tests, etc., that can be performed, at least in part, to obtain initial condition data.

At block 120, vehicle V can be repaired to address one or more complaints C.

At block 122, post-repair initial condition data can be obtained, where the initial-condition data can be obtained as discussed above in the context of block 110.

At block 124, one or more inquiries can be determined based on complaint(s) C and the repair performed at block 120. For example, if complaint(s) C and the repair are both related to a powertrain control system of a vehicle, the inquiries can include inquires about the powertrain control system and perhaps related systems. In this example, the inquiries can specify PIDs related to the powertrain control system, inquiries related to the operating conditions of the vehicle and/or the powertrain control system, and perhaps other inquiries.

The inquiries can specify obtaining data at one time and/or during an interval of time; e.g., get PIDs about the powertrain control system over a three-second interval of time. The inquiries can specify requesting data from multiple sensors of vehicle V, e.g., requesting data from two or more different sensors, such as an oxygen sensor and a coolant temperature sensor. Data related to the inquiries can be obtained at the same time or nearly the same time; or in some cases, some inquiries I1, I2 . . . can be performed at a first time, and other inquiries I3, I4 . . . can be performed after previous inquiries I1, I2 . . . are performed.

The inquiries can specify providing one or more PIDs to vehicle V; e.g., using an OBD scanner and/or other diagnostic equipment, and receiving one or more parameter values in response. For example, if an oxygen sensor was replaced during the repair of block 120, a PID, such as PID 13 or 1D in Mode 1, can be sent to vehicle V to return data about which oxygen sensor(s) are present, and so verify that vehicle V can at least determine that the replaced oxygen sensor is present. The inquiries can specify one or more non-OBD tests to be performed; e.g., tire pressure readings, oil/fluid level checks, tire balancing, road testing.

The inquiries can include questions for technician(s) performing the repair of block 120 and/or for a person/people making complaint(s) C. In some cases, complaint(s) C can be associated with labor codes expressing tasks to be performed, or have been performed, to repair vehicle V. In some embodiments, labor codes can be expressed as alphanumeric codes, text, or combinations thereof. For example, one repair order can list a labor code as an alphanumeric value (e.g., LC233) and another repair order could list text to describe the labor code (e.g., replace front strut).

A taxonomy can be used for finding labor codes corresponding to complaint(s) C and then provided as part of one or more inquiries. An example taxonomy is an electronic dictionary or thesaurus with corresponding terms, such as labor codes. For example, a range of labor code terms (or labor codes, for short) between 1000 and 1999 deal with power train tasks, labor codes between 2000 and 2999 deal with body work tasks, labor codes between 3000 and 3999 deal with emissions/exhaust system, and so on. Then, when complaint C or other textual data is received, the textual data can be translated to one or more specific labor codes using the taxonomy; e.g., text of "engine repair" can translated to specific labor codes 123, 456, 7778 using the taxonomy. In particular embodiments, a decision tree approach can be employed to translate between text and labor codes. For example, a first labor code can be selected, which leads to a first decision. Then, after making the first decision, a second labor code is determined, which leads to a second decision, and so on until no more decisions need to be made or until a particular decision cannot be made; e.g., the particular decision depends on specific text that is ambiguously stated as part of complaint(s) C. Similar techniques based on suitable taxonomies can be used to translate between complaint(s) C and/or other text and other types of codes, such as parts codes for parts used in repairs, or test codes for tests to be run on vehicle V for diagnosis. Many other inquiries are possible as well.

At block 126, the inquiries determined at block 124 can be performed to obtain post-repair data PRD. Post-repair data PRD can include, but is not limited to a time of repair associated with the post-repair data, a time when the post-repair data was obtained, labor code(s), parts code(s) and/or component(s) of vehicle V associated with the post-repair data, PIDs for the post-repair data, a single value of a single PID, multiple values for a single PID, a single value for each of multiple PIDs, multiple values for some or all of multiple PIDs, data from other checks/observations performed on vehicle V, predetermined values, ranges of values, responses to questions to technician(s) performing the repair of block 120 and/or for a person/people making complaint(s) C, and/or other post-repair related data.

At block 128, post-repair data PRD can be adjusted to accommodate for initial and other conditions. For example, if a maximum voltage measured from a battery in vehicle V equals voltage V1 measured as initial conditions at block 110, then any voltages obtained as part of the inquiries of block 126 can be scaled, or otherwise adjusted, based on voltage V1. For example, if V1 was measured to be 4.5 V, but was intended to be 5 V, measured voltages can be scaled up by 0.5 V, which is the difference between the intended and measured values, and/or measured values can be scaled by (about) 111% for comparison with intended values as the ratio of intended to measured voltages, expressed as a percentage is: 5/4.5V is about 111%. Many other examples are possible as well.

At block 130, post-repair data PRD can be matched to recorded data. The recorded data can include post-repair data from successful repairs, unsuccessful repairs, and comeback-related repairs. Some example techniques for matching data values in post-repair data PRD with recorded data are to determine that:

a data value in post-repair data PRD is the same as one or more recorded data values (e.g., a tire pressure reading TPR is 32 pounds per square inch (PSI); a manufacturer name is "Tuftrux"), the data value in post-repair data PRD is within a range of recorded data values (e.g., TPR is between 28 and 34 PSI), the data value in post-repair data PRD is above and/or below a threshold value of a recorded data value (e.g., TPR is in the range of 31±t PSI, where t=the threshold/baseline value), the data value in post-repair data PRD begins with, ends with, or contains the recorded data value (e.g., a vehicle identification number (VIN) begins with a "1" or contains the string of characters "1GT"), one or more keywords associated with recorded data values are found in text of post-repair data PRD (e.g., complaint text in post-repair data PRD includes the keyword "exhaust"), each of a number of data values in post-repair data PRD is the same, within a range, and/or within a threshold of a recorded data value (e.g., tire pressure readings for four tires are all within 28-34 PSI), one or more statistics of value(s) in post-repair data PRD can be compared to one or more statistics of value(s) in recorded data value(s); e.g., suppose a mean value of a time sequence of data; e.g., a collection of data values of the same parameter(s) are observed at various points in time and perhaps arranged in order of recency, in post-repair data PRD is determined and then compared to similar mean value(s) of recorded data, computation(s) on the data value(s) in post-repair data PRD are calculated and compared to the recorded data values (e.g., take an average value of a number of data values, convert English-measure data values to metric-unit equivalents and compare the converted values to metric-unit reference values, use data values in a formula and compare the result of the formula with reference values), and/or negations of these conditions (e.g., a temperature is not within the range of 110-130° F.).

In some cases, a partial or substantial match between post-repair data PRD and recorded data values can be treated as a match. For example, suppose ten data values of post-repair data PRD are used for comparison with recorded data values, and that eight of the ten data values match respective recorded data values. In this example, 80% of the compared value of post-repair data PRD match recorded data values, and so this partial match can be considered to be match. Partial/substantial matching can be determined based on one or more threshold values or percentages. For example, a partial match can be determined if N % of compared post-repair data values match recorded data values for 0<N<100, and a substantial match can be determined if M % of compared post-repair data values match recorded data values for 0<M<100.

In some cases, trends of data can be determined and compared as part of matching. For example, data values can be matched to be exactly the same over time. For example, if a recorded set of data has values 10, 12, 14, 16, 18, and 20, and corresponding post-repair data has values 10, 12, 14, 16, 18, and 20, then the recorded set of data exactly matches the post-repair data. In some cases, data that follows a trend can be considered to match. For example, if the recorded set of data has values 10, 12, 14, 16, 18, and 20, indicating a trend of increasing data values, and the post-repair data is 9.8, 12.1, 13.5, 15.75, 17.9, and 19.95, then the post-repair data can be consider as matching, as the post-repair data follows the trend of increasing data values and is reasonably close the recorded set of data. In another example, again suppose the recorded set of data has values 10, 12, 14, 16, 18, and 20, and the post-repair data is 89, 124, 152, 180, 209, and 238, then the post-repair data follows the trend of increasing, but can be considered not to match either (a) because the post-repair data values are not close to the recorded data values and/or (b) because the rate of increase differs between the two sets of data values. In some cases, the rate of increase (decrease) can be determined in general terms; e.g., linear, quadratic, cubic, exponential, hyperbolic, etc., and rates of increase (decrease) between sets of data values can match if each set of data values has the same generally-termed rate of increase (decrease); e.g., three data sets DS1, DS2, and DS3 can all match if each of DS1, DS2, and DS3 shows a trend of a quadratic rate of decrease.

In particular cases, one set of data can set a trend that is to be followed for other sets to data to match. For example, not taking braking into account, vehicle speed data values can follow a trend of engine revolutions-per-minute (RPM) data values. So if recorded RPM data indicates a slowly increasing (or decreasing) number of RPMs, then the corresponding vehicle speed data values can follow the trend and slowly increase (or decrease). Many other examples of matching based on trends of data are possible as well.

In some cases, a weighted average of matching values can be used to determine a matching percentage for a partial or substantial match. For example, suppose that three data values D1, D2, and D3 in post-repair data are compared with recorded data values, that a 50% match of PRD and recorded data values is considered a partial match, that an 80% match of PRD and recorded data values is considered a substantial match. Further suppose a matching percentage MP is calculated using the following weighted average formula: MP=0.5*MD1+0.3*MD2+0.2*MD3, where MD1, MD2, and MD3 each respectively equal 1 if a respective data value D1, D2, D3 matches corresponding recorded data value(s), and each respectively equal 0 if a respective data value does not match corresponding recorded data value(s). Table 1 below shows, for this example, when partial and substantial matches are determined:

TABLE 1

| MD1 (D1 matches) | MD2 (D2 matches) | MD3 (D3 matches) | MP | Partial match? | Substantial match? |
|---|---|---|---|---|---|
| 0 | 0 | 0 | 0 | No | No |
| 0 | 0 | 1 | 0.2 | No | No |
| 0 | 1 | 0 | 0.3 | No | No |
| 0 | 1 | 1 | 0.5 | Yes | No |
| 1 | 0 | 0 | 0.5 | Yes | No |
| 1 | 0 | 1 | 0.7 | Yes | No |
| 1 | 1 | 0 | 0.8 | Yes | Yes |
| 1 | 1 | 1 | 1 | Yes | Yes |

In some cases, pattern matching rules can be used to match data value in post-repair data PRD. For one example, string patterns can be used for matching, e.g., "1*2" is a string pattern matching a string that begins with a "1" and ends with a "2". As another example, if post-repair data PRD includes a time sequence of data, and one or more trends can be determined from the time sequence of data, those trends can be compared to trends that indicate successful or unsuccessful repairs.

In other cases, a statistical parameter estimation technique, such as but not limited to, a least median of squares estimator can be used The least median of squares technique involves a regression analysis and can also be used to demonstrate the error in estimations of a sequence of data points. For example, let the recorded data include a vector X0 of n>0 measured data points, with X0={$(X_1, Y_1)$, $(X_2, Y_2)$ ... $(X_n, Y_n)$}. The least median of squares estimator can minimize the error between X0 and a vector XE of an estimated values of data points in X0, where XE={$(X_1, \beta_0+\beta_1 X_1)$, $(X_2, \beta_0+\beta_1 X_2)$ ... $(X_n, \beta_0+\beta_1 X_n)$}, with $\beta_0+\beta_1 X_i$ for $1 \leq i \leq n$, representing the estimate for $Y_i$ and with $\beta_0$ and $\beta_1$ being constant values.

To determine $\beta_0$ and $\beta_1$, a least median of squares estimator can be determined by solving the following optimization problem shown in (1) below:

$$\min_{b_0, b_1} \text{median } (SR_i) i = 1 \cdots n \quad (1)$$

where:

$$SR_i = \{(Y_1-[b_0+b_1 X_1])^2, (Y_2-[b_0+b_1 X_2])^2 \ldots (Y_i-[b_0+b_1 X_i])^2\}$$

Upon solving optimization problem (1), $\beta_0$ and $\beta_1$ above can be respectively set to $b_0$ and $b_1$ to estimate the recorded values in vector X0.

Then, after reception of a vector X1 of m>0 measured data points in PRD, with X1={$(X1_1, Y1_1)$, $(X1_2, Y1_2)$ ... $(X1_m, Y1_m)$}, a value D can be determined to compare recorded data X0 and post-repair data X1. For example, D can be a norm of a difference between vector X1 and an estimated vector Xe; that is D=||X1−Xe||, where Xe={$(X1_1, \beta_0+\beta_1 X1_1)$, $(X1_2, \beta_0+\beta_1 X1_2)$ ... $(X1_m, \beta_0+\beta_1 X1_m)$}. The value D, or perhaps a normalized value of D (e.g., D/||Xe|| or D/m), can be compared to one or more predetermined comparison values CV1, CV2. For example, if D<CV1, then vector X1 can be considered to be a substantial match to the existing data points X0; if CV1>D>CV2, then vector X1 can be considered to be a partial match to the existing data points X0; and if D>CV2, then X1 can be considered to "no match" to X1. In particular cases, a difference value D' can be determined based on a vector of weight values W={W1, W2, ... Wm} applied to X1; e.g., D'=||[W]*([Xe−X1])||, such as discussed above with regards to Table 1 as an example of a weighted average of matching values.

In still other cases, the optimization problem shown in (1) can be replaced with a least squares problem, such as shown as optimization problem (2) below, to determine $b_0$ and $b_1$, which can be used as respective values of $\beta_0$ and $\beta_1$:

$$\min_{b_0, b_1} \sum_{i=1}^{n} \{Y_i - (b_0 + b_1 X_1)\}^2 \quad (2)$$

Many other examples and techniques for matching post-repair data PRD to recorded data to are possible as well.

At block 140, a determination is made as to whether data values in post-repair data PRD match with recorded data values such that the repair performed at block 120 is successful or is not successful. If the repair performed at block 120 is determined to be successful, method 100 can proceed to block 144. Otherwise, the repair performed at block 120 is determined to be not successful, and method 100 can proceed to block 142.

At block 142, an indication, such as a post-repair comparison report, that the repair carried out at block 120 was unsuccessful can be generated and provided to device(s), system(s), and/or person(s) responsible for the repair. The indication can include suggestions for one or more additional repairs. Also, post-repair data PRD can be classified as unsuccessful post-repair data PRD and added to the recorded data.

The post-repair comparison report can include a strength indicator for that determination that the repair was unsuccessful, or alternatively, a strength indicator for the determination that the repair could be successful. The strength indicator can be determined and/or modified each time an instance of post-repair data is added to the recorded data. Examples for specifying the strength indicator can include: a likelihood that the repair is (is not) successful, a percentage/number of recorded repairs that match post-repair data PRD, perhaps including overall repair populations (e.g., 70% of recorded repairs match post-repair data, 1,502 recorded repairs match post-repair data, 2146 recorded repairs match complaint C1, 1,502 recorded repairs out of 2146 recorded repairs that include complaint C1 match post-repair data). Other strength indicators are possible as well. After completing block 142, method 100 can proceed to block 120.

At block 144, an indication, such as a post-repair comparison report, that the repair carried out at block 120 was successful can be generated and provided to device(s), system(s), and/or person(s) responsible for the repair. Post-repair data PRD can be classified as pending successful post-repair data PRD and recorded; e.g. added to the recorded data. Pending successful data is data that is classified to be successful pending possible classification revisions; e.g., due to a comeback repair; data added within a predetermined time period of a repair to vehicle V. In some embodiments, any or all post-repair data can be reclassified at any time.

At block 150, a determination can be made as to whether vehicle V is returned for a comeback repair. The determination about a comeback repair can be made based on factors such as, but not limited to:

receiving additional post-repair data with a positive comeback repair indicator, receiving additional post-repair data indicating a comeback repair; e.g., if the additional post-repair data is from a shop that does not charge for comeback repairs, the complaint for the additional post-repair data matches some or all of complaint C and/or labor codes associated with the repair carried out at block 120, and no charge is indicated, then a comeback repair is indicated, whether or not information is received within an elapsed amount of time; i.e., suppose the repair to vehicle V is warranted for W days, and more than W days have elapsed without further repairs to V, then a comeback repair is no longer possible under the warranty; e.g., for W equal to 7, 30, 60, 90, 365, or 366, and other factors related to comeback repairs.

If vehicle V has been returned for a comeback repair, then method 100 can proceed to block 152. Otherwise, method 100 can proceed to block 160.

At block 152, post-repair data PRD associated with the repair made at block 120 can be classified as comeback-related post-repair data PRD.

At block 154, suggestions for the comeback repair can be generated and provided to device(s), system(s), and/or person(s) responsible to carry out the comeback repair. For example, suggestions can be based on repairs that have most likely and/or most often corrected previous comeback repairs that have the same or similar post-repair data to the comeback-related post-repair data PRD. Data about the comeback repair can be added to and/or otherwise associated with comeback-related post-repair data PRD. After completing block 154, method 100 can proceed to block 120 to perform the comeback repair.

At block 160, pending successful post-repair data associated with the repair performed at block 120 can be reclassified as successful post-repair data.

In some scenarios, a last post-repair data associated with repair order or repair history is not classified as pending successful post-repair data. For example, if a technician, customer, and/or other persons do not agree with a repair being classified as unsuccessful and then decide that the repair is complete. As another example, a technician could recommend additional repair to complete a repair order, but the customer could decline to have those additional repairs performed. In an additional example, the original diagnostic and repair work leads to further discovery of problems that involve additional repairs. Then, the customer can decline the additional repairs and so the car is better but not completely repaired. In these (and perhaps other) examples, a repair order related to the completed repair can be associated with last post-repair data that may be classified as unsuccessful. In these scenarios, the last post-repair data can be reclassified to be successful post-repair data, regardless of any previous classification of the post-repair data.

After completing block 160, method 100 can be completed.

In some embodiments, one or more example methods that are related to, but differ from method 100, can be carried out. These one or more example methods can include, but are limited to, as an example method including aspects of blocks 120, 124, 126, 130, 140, and 142 of FIG. 1, another example method including aspects of blocks 120, 124, 126, 130, 140, 144, 150, 152, and 154 of FIG. 1, and/or yet another example method including aspects of blocks 120, 124, 126, 130, 140, 144, 150, and 160.

In other embodiments, method 100 can classify post-repair data into other, different, and/or fewer classes than successful, pending successful, unsuccessful, or comeback-related classes; e.g., classes such as likely successful post-repair data, unlikely successful post-repair data, successful post-repair data for one complaint but unsuccessful for another complaint, etc.

Figure 2A:
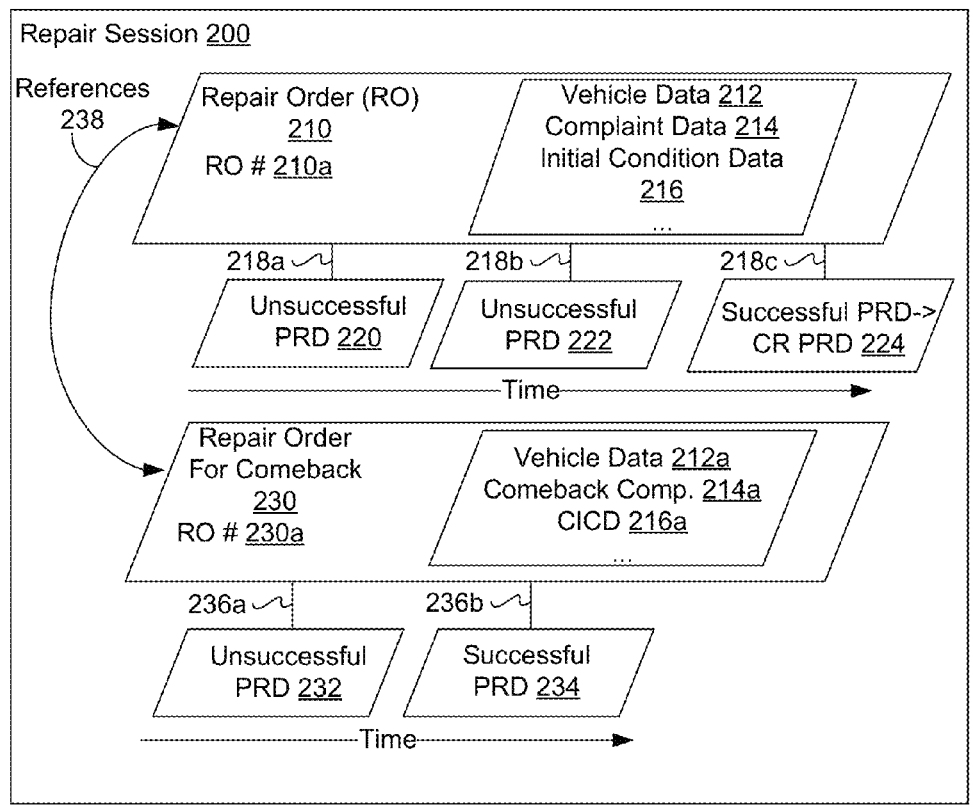
FIG. 2A shows example repair session data, in accordance with an embodiment.

FIG. 2A shows example repair session data 200, in accordance with an embodiment. In some embodiments, repair session data 200 can be or include computer-readable data.

Vehicle, complaint, post-repair, and other data can be organized using a number of techniques. One example technique is to organize data based on repair orders. For example, when a customer enters a service facility to request repair of a vehicle, the service facility can generate a repair order to track progress of the repair.

Two example repair orders 210, 230 connected via references 238 are shown in FIG. 2A. Repair order 210 includes a repair order (RO) number 210a, vehicle data 212, complaint data 214, and initial condition data 216. Vehicle data 212 can include data about a vehicle, or other device-under-service, such as e.g., manufacturer name, year of manufacture, model information; odometer/hours of operation (e.g., mileage for a ground vehicle, operating and/or flight hours for an aircraft) information; information about components of the device-under service; e.g., engine information, control unit information, age/manufacturer of components, a vehicle identification number (VIN), serial number, and/or other identifying number(s) associated with the vehicle, one or more license plate/registration numbers associated with the vehicle, information about the owner(s) of the vehicle; e.g., name(s), mailing address(es), electronic/e-mail addresses, credit card/financial information, and/or other information related to the vehicle (e.g., text or other observations about the vehicle).

Complaint data 214 can include any information about one or more complaints about the vehicle/device-under-service that lead to requesting the repairs for repair order 210; e.g., information about known symptoms/problems about the vehicle/device-under-service associated with vehicle data 212. Complaint data 214 can include textual, audio, video, and/or other descriptions of the complaint(s) about the vehicle/device-under-service, labor and/or other codes associated with the complaint(s) about the vehicle/device-under-service, and/or other complaint-related data. Initial-condition data 216 can include any data obtained about initial conditions about the vehicle/device-under-service that are not already part of vehicle data 212 and complaint data 214, such as discussed above in at least in the context of blocks 110 and 122 of FIG. 1. Initial-condition data 216 can indicate conditions that exist at a time repair order 210 is generated or at another time associated with repair order 210, such as a time when repairs are started to address the complaint(s) about the vehicle/device-under-service associated with repair order 210, or a time when repairs are scheduled to start to address the complaint(s) about the vehicle/device-under-service associated with repair order 210.

Repair order 210 also includes references 218a, 218b, 218c to respective post-repair data (PRD) 220, 222, 224. As shown in FIG. 2A, time related to post-repair data runs from left to right for post-repair data 220, 222, 224; that is, post-repair data 220 is older than post-repair data 222, and post-repair data 222 is older than post-repair data 224. Data in each of post-repair data 220, 222, 224 can be as described above in the context of at least block 126 of FIG. 1. For example, as part of repair order 210, three repairs to the vehicle/device-under service were attempted: two attempts determined to be unsuccessful and associated with post-repair data 220 and 222, and one attempt determined to be initially successful and associated with post-repair data 224.

In the example shown in FIG. 2A, repair order 230 is related to a comeback repair for the repair related to repair order 210. As such, references 238 can link repair order 210 to repair order 230 and vice versa to indicate a relationship between the two repair orders 210, 230; e.g., the two repair orders are directed to at least one common complaint about the same vehicle. Repair order 230 includes vehicle data 212a that is similar to or the same as vehicle data 212 described above, complaint data 214a that shares at least one complaint with complaint data 214, and so is similar to or the same as complaint data 214 described above.

Comeback initial-condition data (CICD) 216a can include any data obtained about initial conditions about the vehicle/device-under-service at a time of repair order 230 not already part of vehicle data 212a and complaint data 214a, such as discussed above in at least in the context of blocks 110 and 122 of FIG. 1. Comeback initial-condition data (CICD) 216a can indicate conditions that exist at a time repair order 230 is generated or at another time associated with repair order 230, such as a time when repairs are started to address the complaint(s) about the vehicle/device-under-service associated with repair order 230, or a time when repairs are scheduled to start to address the complaint(s) about the vehicle/device-under-service associated with repair order 230.

Upon determining repair order 230 is related to a comeback repair, post-repair data 224 can be reclassified as comeback-related (CR) post-repair data 224, such as discussed above in the context of block 152 of FIG. 1.

Repair order 230 also includes references 236a, 236b to respective post-repair data 232, 234. As shown in FIG. 2A, time related to post-repair data runs from left to right for post-repair data 232, 234; that is, post-repair data 232 is older than post-repair data 234. Data in each of post-repair data 232, 234 can be as described above in the context of at least block 126 of FIG. 1. For example, as part of repair order 230, two repairs to the vehicle/device-under service were attempted: one attempt determined to be unsuccessful and associated with post-repair data 232, and one attempt determined to be successful and associated with post-repair data 234.

Figure 2B:
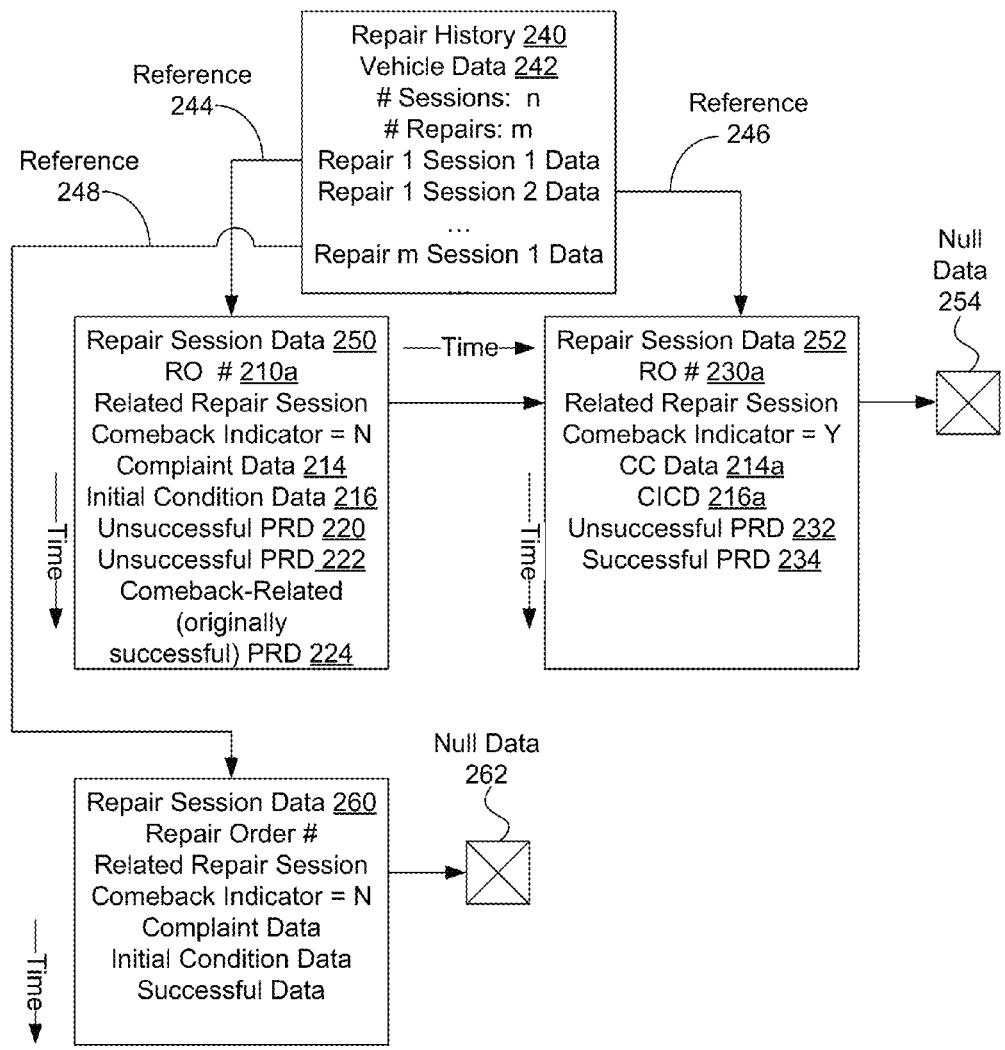
FIG. 2B shows example repair history data, in accordance with an embodiment.

Another technique for organizing repair related data is an organization based on repair histories. FIG. 2B shows example repair history 240, in accordance with an embodiment. In some embodiments, repair history 240 can be or include computer-readable data.

Repair history 240 includes common data about a number of repairs to a vehicle described using vehicle data 242. The common data includes vehicle data 242, a number of repair sessions, a number of repairs, and one or more references to repair session data. In other embodiments, more, less, or different data can be part of repair history 240. Vehicle data 242 can include data described as vehicle data 212 of FIG. 2A.

A repair session can summarize one or more repairs made to a vehicle/device-under-service during one repair interval at a repair facility; that is, a repair session can represent the same or similar data as a repair order of FIG. 2A. In some embodiments, repair session data, such as repair session data 250, 252, 260 can include the data discussed above in the context of repair orders 210, 230, except that post-repair data may be included in the repair session data, and so references 218a, 218b, 218c for repair order 210 can be modified or eliminated when represented as repair session data 210. Also, data mainly or completely common to multiple repair orders, such as vehicle data, can be removed from each repair order, and placed as common data in repair history 240.

Repair history 240 shows that a total of n repair sessions involving a total of m repairs (or repair attempts) have been conducted for the vehicle described by vehicle data 242. Repair session data 250 can also include references 244, 246, 248 to respective repair session data 250, 252, 260 corresponding to three repair sessions.

Repair session data 250 is based on repair order 210; e.g., repair session data 250 includes repair order number 210a, complaint data 214, initial condition data 216, and post-repair data for two unsuccessful repair attempts 220, 222, and comeback-related post-repair data 224 referenced by repair order 210. Repair session data 250 also includes a comeback indicator, set to "N" (No) in FIG. 2B, as repair order 210a was not for a comeback repair and a related repair session reference. The related repair session reference can point, or refer, to repair session data, if any, related to the current repair session and that occurred later in time than a repair session recorded using repair session data 250. For example, a related repair session reference can point to repair session data for a comeback repair, to a repair postponed due to lack of resources (e.g., missing parts, suitably trained technicians), a repair related to a complaint only discoverable after repairs made in the current repair session (e.g., a complaint having multiple sources, only some of which were mentioned in the complaint for the current repair session) and/or otherwise related to the current repair session.

Repair session data 252 is based on repair order 230; e.g., repair session data 252 includes repair order number 230a, comeback complaint (CC) data 214a, comeback initial-condition data 216, and post-repair data for one unsuccessful repair attempt 232 and one successful repair attempt 234 referenced by repair order 230. Repair session data 252 also includes a comeback indicator, set to Y (Yes), as repair order 230 was for a comeback repair and a related repair session reference to null data 254, indicating that no later repair sessions relate to repair session data 252. As repair session data 252 relates to a comeback repair for an initial repair attempted during the repair session recorded using repair session data 250, the related repair session reference for repair session data 252 refers to repair session data 250.

Repair session data 260 is based on a repair order not shown in the figures, related to the $m^{th}$ repair of the vehicle/device-under service described by vehicle data 242. Repair session data 260 includes a repair order number, a comeback indicator set to N, complaint data related to the repair, initial condition data for the repair and post-repair data for one successful repair attempt. Repair session data 260 also includes a related repair session reference to null data 262, indicating that no later repair sessions relate to repair session data 260.

Figure 2C:
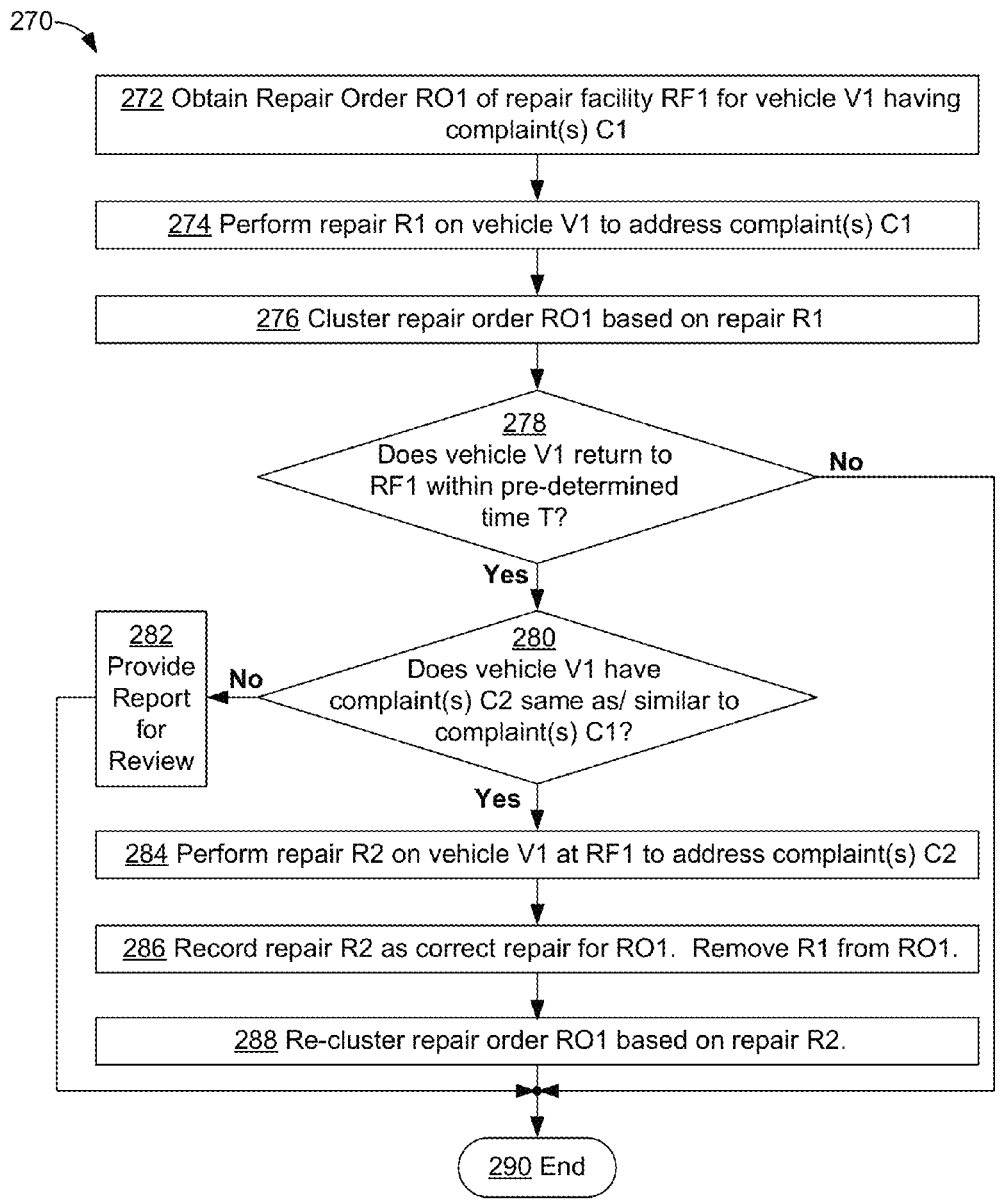
FIG. 2C is a flowchart of a time series study method, in accordance with an embodiment.

FIG. 2C is a flowchart of time series study method 270, in accordance with an embodiment. Some aspects of method 270 can be carried out by a computing device, such as computing device 700 discussed below in the context of FIG. 7A. Method 270 can begin at block 272, where the computing device can obtain repair order RO1 of repair facility RF1 for vehicle V1 having one or more complaints C1. At block 274, a repair R1 can be performed on vehicle V1 to address complaint(s) C1.

At block 276, the computing device can assign repair order RO1 to one or more clusters based on repair R1. For example, suppose that complaint(s) C1 include an indication "the engine misfires" and that repair R1 includes replacing an ignition coil of vehicle V1 in an attempt to address complaint(s) C1. Then, the computing device can assign RO1 to a cluster, such as a cluster labeled as "cluster P0300, replaced ignition coil" based on the repair R1 performed to address complaint(s) C1.

Later, the computing device can carry out block 278 to determine if vehicle V1 returned to repair facility RF1 within a pre-determined time T (e.g., one or more days, weeks, and/or months). If the computing device determines that vehicle V1 did not return to repair facility RF1 within the pre-determined time T, then the computing device/method 270 can proceed to block 290. Otherwise, the computing device can determine that vehicle V1 did return to repair facility RF1 within the pre-determined time T, and the computing device/method 270 can proceed to block 280.

At block 280, the computing device can determine if vehicle V1 returned to repair facility RF1 with one or more complaints C2 that are the same as or similar to the complaint(s) C1. If the computing device determines that complaint(s) C2 are not the same or similar to complaint(s) C1, then the computing device/method 270 can proceed to block 282. Otherwise, the computing device can determine that complaint(s) C2 are the same or similar to complaint(s) C1, and so the computing device/method 270 can proceed to block 284.

At block 282, the computing device has already determined that complaint(s) C2 are not the same or similar to complaint(s) C1. Then, when a repair is completed attempting to address complaint(s) C2, a report can be provided by the computing device for review. The review can verify that the repair attempting to address complaint(s) C2 would not be a repair that attempts to address complaint(s) C1; that is, the report can verify that complaint(s) C2 really are not the same or similar to complaint(s) C1. The review can be carried out by the computing device and/or another entity; e.g., one or more persons and/or one or other computing devices. After completion of block 282, method 270 can proceed to block 290.

At block 284, repair R2 can be performed at repair facility RF1 on vehicle V1 to address complaint(s) C2.

At block 286, the computing device can be used to record repair R2 as a correct repair for repair order RO1 and to remove repair R1 from RO1.

At block 288, the computing device can re-cluster repair order RO1 based on repair R2. That is, the computing device can assign repair order RO1 to one or more clusters based on repair R2.

To continue the example above where repair order RO1 was assigned to a cluster labeled as "cluster P0300, replaced ignition coil", further suppose that complaint(s) C1 and C2 both include an indication "the engine misfires". In this example, suppose that repair R2 includes replacing one or more spark plugs of vehicle V1 in an attempt to address complaint(s) C2 (and C1). Then, the computing device can reassign RO1 to a new cluster, such as a cluster labeled as "cluster P0300, replaced spark plugs", based on replacing spark plugs as part of repair R2. In some embodiments, the new cluster can be generated at this time, or can be previously generated. Cluster indications can be stored by the computing device; e.g., as part of the repair order RO1, as a list or other organization of clusters, and/or using some other storage technique.

The new cluster assignment can replace the previous "cluster P0300, replaced ignition coil" cluster assignment for RO1 made at block 276, where the previous cluster assignment was based on repair R1 alone. In some embodiments, multiple clusters can be assigned to the same repair order—in such embodiments, the new cluster assignment of "cluster P0300, replaced spark plugs" can be appended to and/or otherwise combined with the previous "cluster P0300, replaced ignition coil" cluster assignment for RO1 made at block 276.

At block 290, method 270 can end. In some embodiments, method 270 can be included in a loop or other software construct for iteration/repetition. In these embodiments, the procedures of block 290 can involve termination of one loop iteration involving method 270 rather than a complete termination of method 270.

Figure 3A:
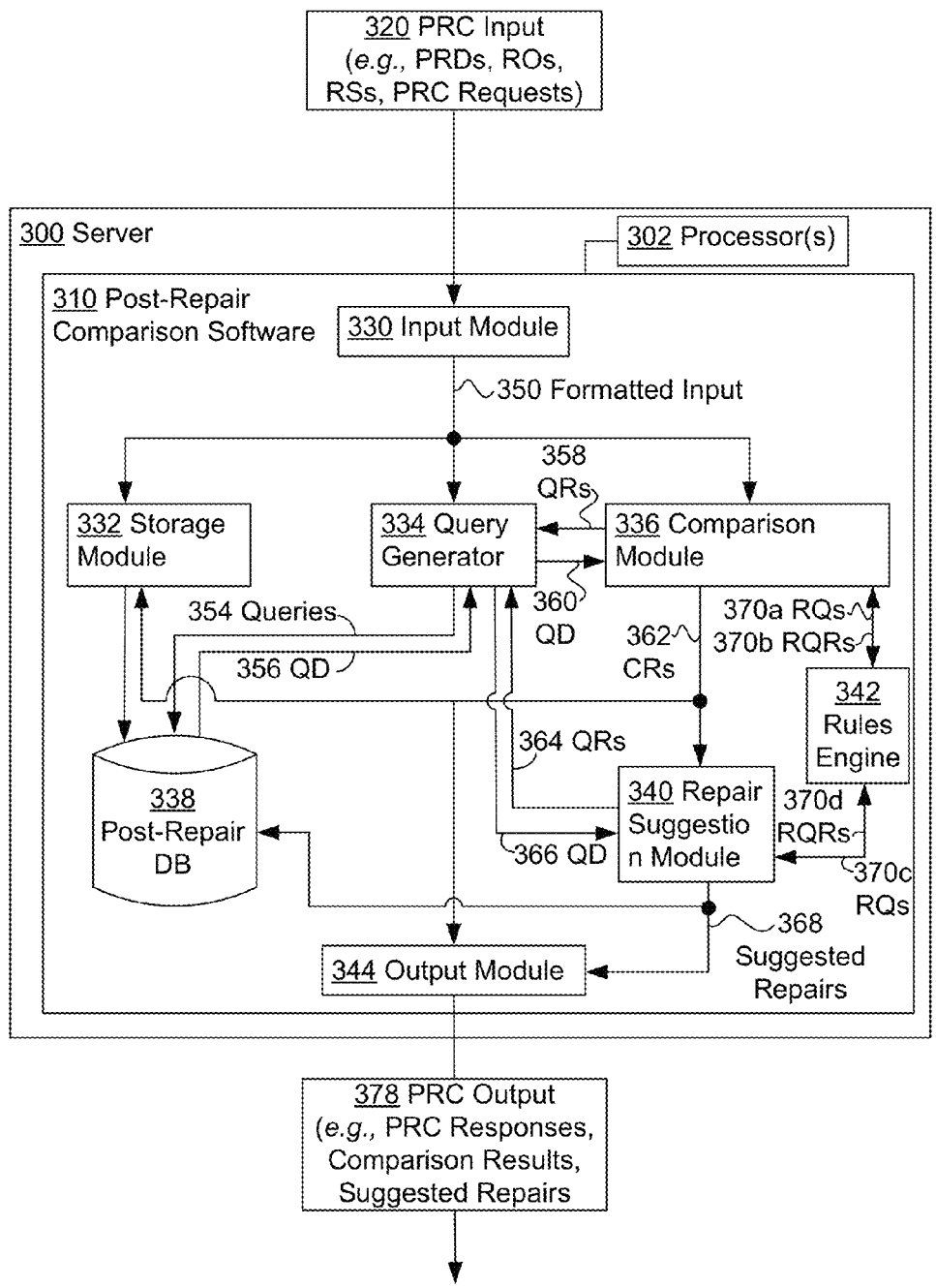
FIG. 3A shows an example server, in accordance with an embodiment.

FIG. 3A shows an example server 300, in accordance with an embodiment. Server 300 includes post-repair comparison software 310. As shown in FIG. 3A, post-repair comparison software 310 includes input module 330, storage module 332, query generator 334, comparison module 336, post-repair database (DB) 338, repair suggestion module 340, rules engine 342, and output module 344.

In some embodiments, post-repair comparison software 310 can be implemented using stored executable instructions that, when executed by one or more processors 302 of server 300, cause server 300 to perform at least part or all of the herein-described functionality of post-repair comparison software 310. In other embodiments, part of all of the functionality of post-repair comparison software 310 can be implemented using hardware components other than processor(s) 302; e.g., application-specific integrated circuits (ASICS). In other embodiments, some or all of components 330-344 of post-repair comparison software can be merged and/or further subdivided.

Server 300 can receive post-repair comparison (PRC) input 320 from one or more sources, such as, but not limited to, computing devices and diagnostic equipment located at one or more repair facilities. As indicated by FIG. 3A, post-repair comparison input 320 can include, but is not limited to, post-repair data, partial and/or complete repair orders, partial and/or complete repair sessions (RSs), and post-repair comparison requests.

Post-repair comparison input 320 can be received by input module 330 of post-repair comparison software 310. Input module 330 can screen post-repair comparison input 320 to ensure the input data agrees with predetermined input formats; e.g., verify a received VIN value has the proper number of alphanumeric symbols and the received VIN value agrees with a standard VIN format. Once input data of post-repair comparison input 320 passes screening, the input data can be formatted as formatted input 350 for use by other components of post-repair comparison software; e.g., the input data can be used to populate software objects, data structures, data fields, etc.

Formatted input 350 can be provided by input module 330 to one or more components of post-repair comparison software. FIG. 3A shows formatted input 350 provided to storage module 332, query generator 334, and comparison module 336. In some embodiments, part or all of post-repair comparison input 320 and/or formatted input 350 can be provided to more, fewer, and/or different components of post-repair comparison software 310.

Storage module 332 can receive formatted input 350 and store part or all of the received input as post-repair database 338. Storage module 332 can be configured to convert or otherwise reformat formatted input 350 as database records and/or database fields; e.g., reformat formatted input 350 as part of all of one or more database records to be stored in one or more relational database tables and/or to be stored in one or more other database formats.

Query generator 334 can generate one or more queries 354 to retrieve information from post-repair database 338, perhaps based on part or all of formatted input 350. Example queries can request that post-repair database 338 provide data corresponding to: all repair session records associated with a particular VIN or other identifier, all repair orders from a particular repair facility on a particular date, all (successful, unsuccessful, and/or comeback-related) post-repair data with values for a particular PID or PIDs, all (successful, unsuccessful, and/or comeback-related) post-repair data generated within a particular date range, for one or more given manufacturers, one or more particular models, one or more particular years of manufacture, and/or one or more vehicle production option codes/regular production options. Many more examples of queries 354 are possible as well.

In response to queries 354, post-repair database 338 can provide query data (QD) 356, perhaps formatted as a query response (QR). Query data 356 can be in the format of database fields and/or records. In some embodiments, query generator 334 can reformat query data 356 as query responses; e.g., query data 356 can be used to populate software objects, data structures, data fields, etc. to make up a query response.

Comparison module 336 can receive part or all of formatted input 350; e.g., post-repair comparison requests, and responsively generate comparison results (CRs) 362, such as post-repair comparisons and post-repair comparison reports. An example post-repair comparison report is shown as post-repair comparison report 380 of FIG. 3B, discussed below.

Comparison module 336 can examine post-repair data and other related data, such as related repair orders and/or repair sessions, associated with an input post-repair comparison request and attempt to match the post-repair data and/or the other related data with data stored in post-repair database 338. For example, comparison module 336 can match post-repair data with data stored in post-repair database 338 using some or all of the techniques discussed with respect to block 130 of method 100 discussed above in the context of FIG. 1.

Comparison module 336 can use one or more rules to control or guide comparisons between post-repair data and recorded data. For example, comparison module 336 can provide rules queries (RQs) 370a to rules engine 342 requesting rules for comparing part or all of post-repair data and recorded data. Example rules queries 370a include, but are limited to, queries for: rules related to one or more particular vehicles, rules related to one or more particular PIDs, rules related to comeback-related data, rules related to one or more labor codes, rules related to one or more parts codes, and combinations thereof (e.g., rules related to a particular PID and a particular part code). In response to rules queries 370a, rules engine 342 can provide rules query responses (RQRs) 370b with the requested rules. In some embodiments, comparison module 336 can incorporate rules, including rules retrieved via rules queries 370a; that is, comparison module 336 can include some or all of the functionality of rules engine 342.

To obtain recorded data from post-repair database 338, comparison module 336 can provide one or more query requests (QRs) 358 to query generator 334 to request queries of post-repair database 338. In response to query requests 358, query generator 334 can provide query data 360 obtained from post-repair database 338. In some embodiments, comparison module 336 can include part or all of the functionality of query generator 334; e.g., comparison module 336 can query post-repair database 338 directly and receive query data 360 directly from post-repair database 338 in response to such queries.

Once recorded data is obtained from post-repair database 338, the recorded data can be examined by comparison module 336 to determine a likelihood that repair procedures Ry associated with input post-repair data PRDy are to address a complaint Cy about a vehicle Vy associated with post-repair data PRDy. For example, comparison module 336 can first generate query requests 358 to obtain all post-repair data and repair orders for vehicles with the same manufacturer, same model, and same year vehicle Vy and that addressed the same or similar complaints as complaint Cy.

Data related to repairs addressing compliant Cy can be used to estimate a likelihood that repair procedures Ry addressed complaint Cy. For example, suppose that post-repair database 338 stores N database records related to complaint Cy for models having the same manufacturer, model, and year of manufacture as vehicle Vy. If N is below a threshold number of database records; e.g., N<100, 500, 1000, additional data can be obtained. In some other examples, comparison module 336 can obtain additional data by expanding the search to other models that are related to the model of the vehicle being repaired; e.g., models made using the same vehicle platform, models made in prior or subsequent years that use the same generation of the vehicle platform, etc. In other examples, a post-repair comparison can proceed with less than the threshold number of database records; e.g., for unusual vehicles, when the database is initially obtaining data, etc.

Then, comparison module 336 can scan the N database records related to complaint Cy and vehicle Vy to determine values including, but limited to, a number of successful records NSy where complaint Cy was successfully repaired using repair procedure Ry, a number of unsuccessful records NUy where complaint Cy was not successfully repaired using repair procedure Ry, and a number of comeback-related records NCy where repair procedure Ry was performed and a subsequent comeback repair was made. Then, an estimated success rate can be determined based on: a ratio NSy/N of the number of successful records NSy to the number N of database records, a ratio NUy/N of the number of unsuccessful records NUy to the number N of database records, a ratio (NSy−NUy)/N of a difference between the number of successful records NSy and the unsuccessful records NUy to the number N of database records, where the value 0 is used if (NSy−NUy)/N is negative, a ratio (a*NSy+b*NUy+c*NCy)/N of linear combination of the numbers of successful records NSy, unsuccessful records NUy, and comeback records NCy, with a, b, and c each being predetermined values, to the number N of database records, and where the value 0 is used if linear combination a*NSy+b*NUy+c*NCy is negative. Other estimates of a likelihood of successful or unsuccessful repairs are possible as well.

Repair suggestion module 340 can receive part or all of formatted input 350; e.g., post-repair comparison requests, and responsively suggest zero or more additional repairs to address issues determined to be unresolved by repairs related to the received post-repair data. Example suggested repairs are shown as "Suggested Additional Procedures to Avoid Comeback" in report results 394 of FIG. 3B, discussed below.

Repair suggestion module 340 can use comparison reports 362 provided by comparison module 336 to determine the zero or more additional repairs. For example, repair suggestion module 340 can first determine if any additional repairs should be provided based on a comparison of post-repair data to recorded data in comparison reports 362. That is, if comparison report 362 indicates that a repair associated with received post-repair data addressed a complaint associated with the repair, then repair suggestion module 340 can determine that no additional repairs are to be generated. In another example, a comparison report of comparison reports 362 can indicate that the repair associated with received post-repair data did not address the complaint. Then, repair suggestion module 340 can determine that at least one additional repair can be provided as suggested repairs 368.

Repair suggestion module 340 can use one or more rules to control or guide comparisons between post-repair data and recorded data. For example, repair suggestion module 340 can provide rules queries 370c to rules engine 342 requesting rules for determining suggested repairs. Example rules queries 370c can include, but are limited to, the example rule queries 370a mentioned above. In response to rules queries 370c, rules engine 342 can provide rules query responses 370d with the requested rules. In some embodiments, repair suggestion module 340 can incorporate rules, including rules retrieved via rules queries 370b; that is, repair suggestion module 340 can include some or all of the functionality of rules engine 340.

Suggested repairs 368 can be determined using data in post-repair database 338. To obtain data from post-repair database 338, repair suggestion module 340 can provide one or more query requests 364 to query generator 334 to request queries of post-repair database 338. In response to query requests 364, query generator 334 can provide query data 366 obtained from post-repair database 338. In some embodiments, repair suggestion module 340 can include part or all of the functionality of query generator 334; e.g., repair suggestion module 340 can query post-repair database 338 directly and receive query data 366 directly from post-repair database 338 in response to such queries.

Once recorded data is obtained from post-repair database 338, the recorded data can be examined by repair suggestion module 340 to determine successful repair procedures related to a complaint Cz associated with input post-repair data. For example, repair suggestion module 340 can first generate query requests 364 to obtain all successful post-repair data and repair orders for vehicles with the same manufacturer, same model, and same year as a vehicle being repaired and that addressed the same or similar complaints as complaint Cz. In some other examples, repair suggestion module 340 can obtain additional data by expanding the search to other models that are related to the model of the vehicle being repaired; e.g., models made using the same vehicle platform, models made in prior or subsequent years that use the same generation of the vehicle platform.

Then, repair suggestion module 340 can determine repair procedures that were performed as part of repairs recorded in post-repair database 338 but not performed for the input post-repair data and suggest the not-yet-performed repair procedure as suggested repairs 368. Suggested repairs 368 can be sorted; e.g., by a number of successful repairs associated with each particular repair procedure, by a number of successful comeback-related repairs associated with each particular repair procedure, by an amount of time estimated to perform each particular repair procedure, by a number or estimated cost of parts likely to be used to perform each particular repair procedure.

In some embodiments, suggested repairs 368 can be determined, at least in part, based on flow charts, taxonomies, lists, and/or other groupings of repairs. For example, repair suggestion module 340 can examine a complaint indicated as part of formatted input 350 and/or comparison report 362, labor codes, part codes, and/or post-repair data with respect to an organization of repairs to determine which repairs may remain to be performed, and so can be provided as suggested repairs 368. For example, suppose a complaint Cz related to a component COz of a vehicle Vz was received, and that a comparison report for post-repair data related to a repair Rz involving labor codes LCz1 and LCz2 was generated by comparison module 336, and that comparison module 336 determined that Rz likely did not address complaint Cz. Then, repair suggestion module 340 can find one or more flow charts, taxonomies, lists, and/or other groupings of repairs related to Cz, Coz, Vz, and/or other related repairs to determine a series of repairs that can be used to address Cz. Other related repairs can include repairs performed as part of a repair order that led to a comeback repair related to complaint Cz, component Coz, and/or vehicle Vz, repairs performed as part of a repair order that successfully addressed complaint Cz, repairs performed on Vz and/or similar vehicles, and/or repairs performed using component Coz and/or similar/related components.

Based on the post-repair data and/or labor codes LCz1 and LCz2, repair suggestion module 340 can traverse the grouping(s) of repairs to see if all possible repairs that comport with post-repair data, complaint Cz, and/or labor codes LCz1 and LCz2 have actually been performed.

In particular embodiments, data from post-repair database can be used to annotate an organization of repairs. For example, suppose an example flowchart to repair a complaint Cy is as in Table 2A:

TABLE 2A

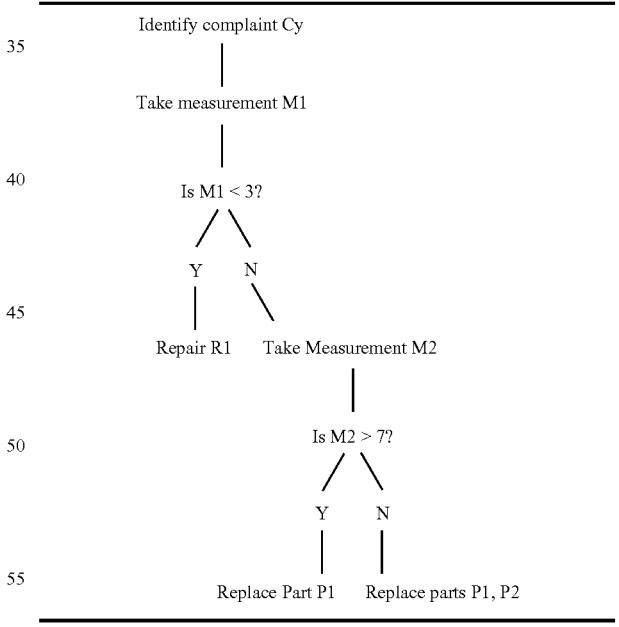

Then, in this example, suppose measurement M1 was taken to obtain an M1 value of 2.2, and repair R1 was performed. Then, as part of a post-repair comparison, the flowchart can be annotated with data obtained and related to procedures performed by the repair that lead to the post-repair data. An example of such an annotated flowchart is shown in Table 2B below, with annotated states of the flowchart shown in a bold font.

TABLE 2B

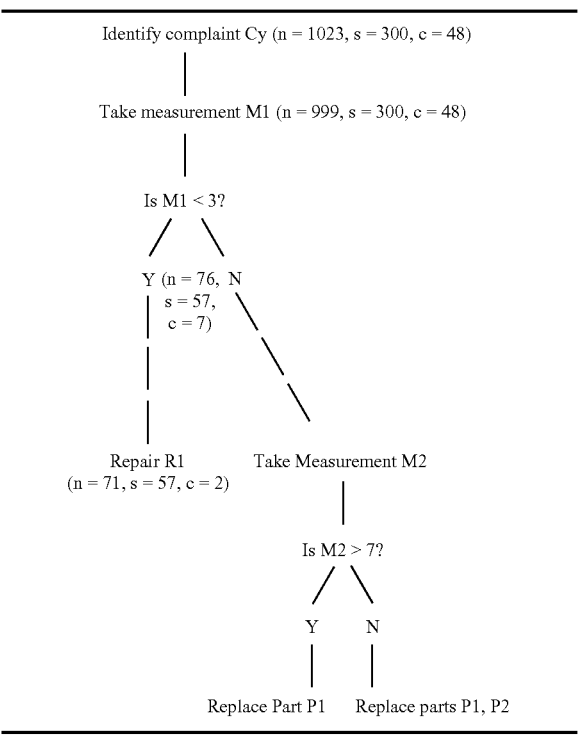

In the annotated flowchart shown in Table 2B, each annotation has three values: n, for a total number of database records associated with a state in the flow chart, s, for a number of successful repairs associated with that state, and c, for a number of comeback repairs associated with that state. For example, the "Identify complaint Cy" state has an annotation "(n=1023, s=300, c=48)" indicating 300 successful database records and 48 comeback database records out of a total of 1023 database records related to the "Identify complaint Cy". The annotation related to the repair R1 performed in this example is "(n=71, s=57, c=2)" indicating that out of 71 total database records related to repair R1 in the context indicated by the flowchart of Tables 2A and 2B, that 57 of those database records relate to a successful repair, and two records relate to comeback repairs. Therefore, if repair R1 is carried out successfully, it is likely that the repair R1 will successfully address complaint Cy, as the related annotation indicates that 57 out of 71 repairs were successful and only two led to comeback repairs.

Comparison reports 362 and/or suggested reports 368 can be stored in post-repair database 338 to permit auditing of comparison reports against later data, to later review results provided related to particular repair, and/or to maintain more complete repair records. For example, comparison reports 362 and/or suggested reports 368 can be stored with repair orders, repair sessions, and/or repair histories to indicate when post-repair comparisons were performed and the content of provided post-repair comparisons.

FIG. 3A shows that comparison reports 362 and suggested reports 368 can be provided to output module 344 for output as post-repair comparison output 378. Post-repair comparison output 378 can include post-repair comparison responses; that is, responses to post-repair comparison requests. Post-repair comparison output 378 can also, or instead, include comparison results, suggested repairs, post-repair comparison reports, flowcharts, annotated flowcharts, and/or other post-repair-comparison-related information.

Figure 3B:
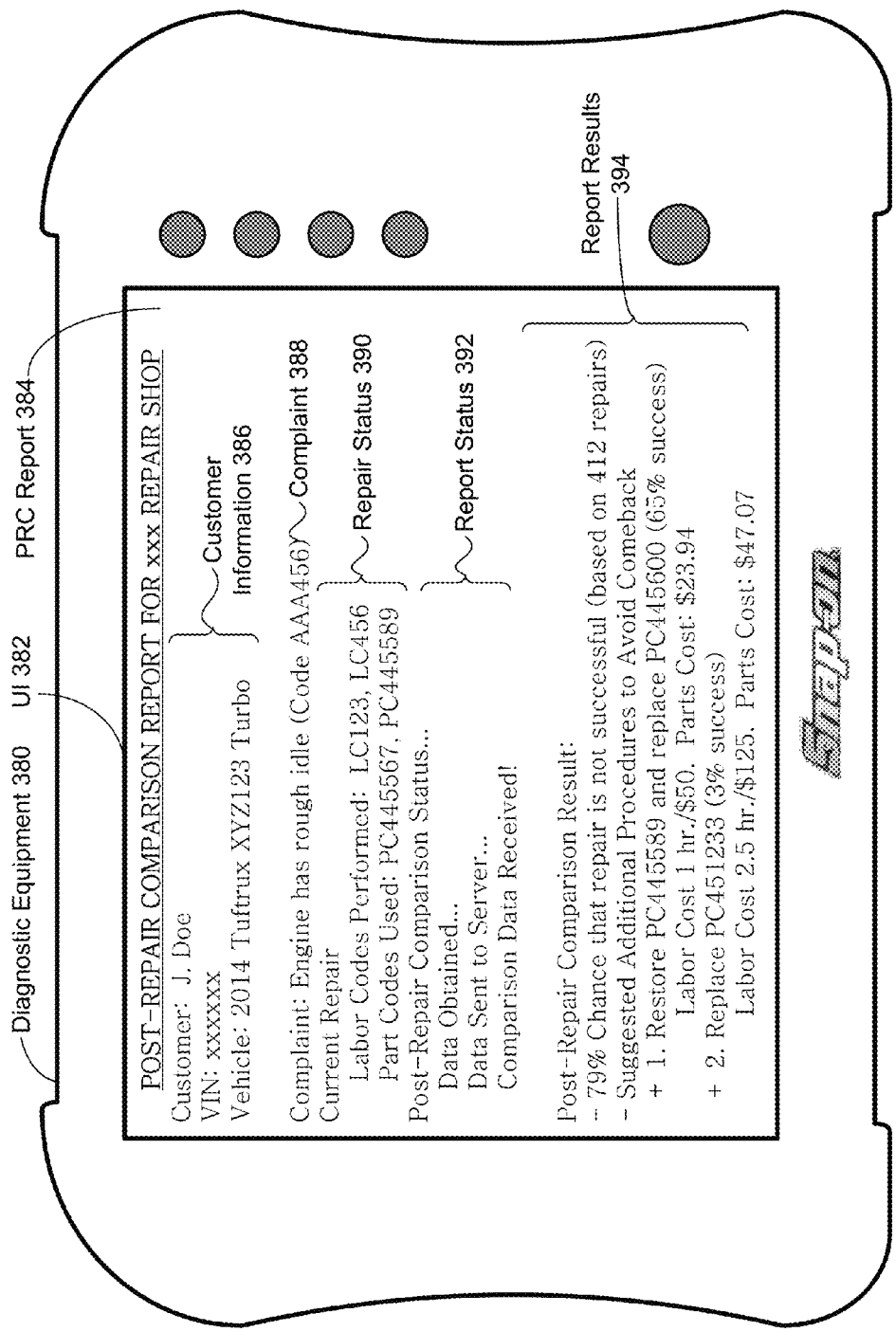
FIG. 3B shows example diagnostic equipment displaying a post-repair comparison report, in accordance with an embodiment.

FIG. 3B shows example diagnostic equipment 380 with a user interface 382 displaying post-repair comparison (PRC) report 384, in accordance with an embodiment. For example, user interface 380 can be and/or include graphical user interface software configured to execute on one or more processors of diagnostic equipment 380. Post-repair comparison report 384 can be used to track comparisons of post-repair data with recorded data and to review results of these comparisons. More, less, or different information can be provided in post-repair comparison report 384 than shown in FIG. 3B. Information in post-repair comparison report 384 can be provided using graphical content, textual content, video content, and/or audio content. Post-repair comparison report can be requested using a command, via one or more component of user interface 382; e.g., selection of an icon or button, activating an application, use of a dialog/form, and/or based on other user-interface-related technique(s) to request an output, such as post-repair comparison report 384.

Post-repair comparison report 384 includes customer information 386, complaint 388, repair status 390, report status 392, and report results 394. As shown in FIG. 3B, customer information 386 can include a customer name "J. Doe", a vehicle identification number (VIN), and a description of a vehicle "2014 Tuftrux XYZ123 Turbo" that identifies a year of manufacture "2014", a manufacturer "Tuftrux", and a vehicle model "XYZ123 Turbo". In some embodiments, more, less, and/or different information can be included as customer information 386.

FIG. 3B indicates that complaint 388 includes a textual complaint "Engine has rough idle" and a complaint code "Code AAA456" that can be used to identify the complaint. In some embodiments, more, less, and/or different information can be included as complaint 388. FIG. 3B indicates that repair status 390 includes a listing of labor codes performed "LC123, LC456" and part codes used "PC445567, PC445589", that can be used to respectively identify labor and parts used to perform a repair. In some embodiments, more, less, and/or different information can be included as repair status 390.

Report status 392 can be updated to show progress of a post-repair comparison. FIG. 3B shows that report status 392 includes "Data Obtained" to indicate data for a post-repair comparison has been obtained at diagnostic equipment 380 for a post-repair comparison. The data can be obtained from one or more of diagnostic equipment 380, customers (e.g., to provide part or all of customer information 386 and/or complaint 388), technicians (e.g., to update repair status 390 and/or to perform activities related to gathering post-repair data), other diagnostic equipment other computing devices, and other sources.

Repair status 392 also includes "Data Sent to Server" to indicate that the obtained data has been sent from diagnostic equipment 380 to a server; e.g., server 300, or other computing device(s) to perform the post-repair comparison. Report status 392 further includes "Comparison Data Received!" to indicate that the requested post-repair comparison has been completed. In some embodiments, more, less, and/or different information can be included as report status 392.

FIG. 3B depicts report results 394 including information about a likelihood of success of a repair "79% Chance that repair is not successful (based on 412 repairs)" that includes information about a number "412" of repair-related records used to estimate the likelihood of success; e.g., database records of post-repair database 338 discussed above in the context of FIG. 3B. Report results 394 also indicates additional repair procedures to avoid a comeback repair—in the example shown in FIG. 3B, two additional repair procedures are shown: a first procedure Restore PC445589 and replace PC445600" and a second procedure "Replace PC451233". For the first procedure, FIG. 3B shows an estimate of success "65% success", an estimated labor cost "1 hr./$50", and an estimated parts cost "$23.94". For the second procedure, FIG. 3B shows an estimate of success "3% success", an estimated labor cost "2.5 hr./$125", and an estimated parts cost "$47.07". In some embodiments, more, less, and/or different information can be included as report results 394.

In still other embodiments, diagnostic equipment 380 and/or user interface 382 can enable selection of related operations to post-repair comparison report 384. For example, in the example shown in FIG. 3B, a user of diagnostic equipment 380 may be able to select a suggested repair procedure and request inventory information for parts used in the selected repair procedure, watch, read, and/or listen to information related to the selected repair procedure; e.g., watch and/or listen a video demonstrating the suggested repair procedure, read a manual page or repair organization related to the suggested repair procedure, check a cost and/or time estimate provided to the customer for the overall repair, view a listing of available technicians and/or other personnel trained to perform the suggested repair procedure and/or available to perform the suggested repair procedure. Many other examples of related operations are possible as well.

Example Post-Repair Data Comparison Scenarios

Figure 4A:
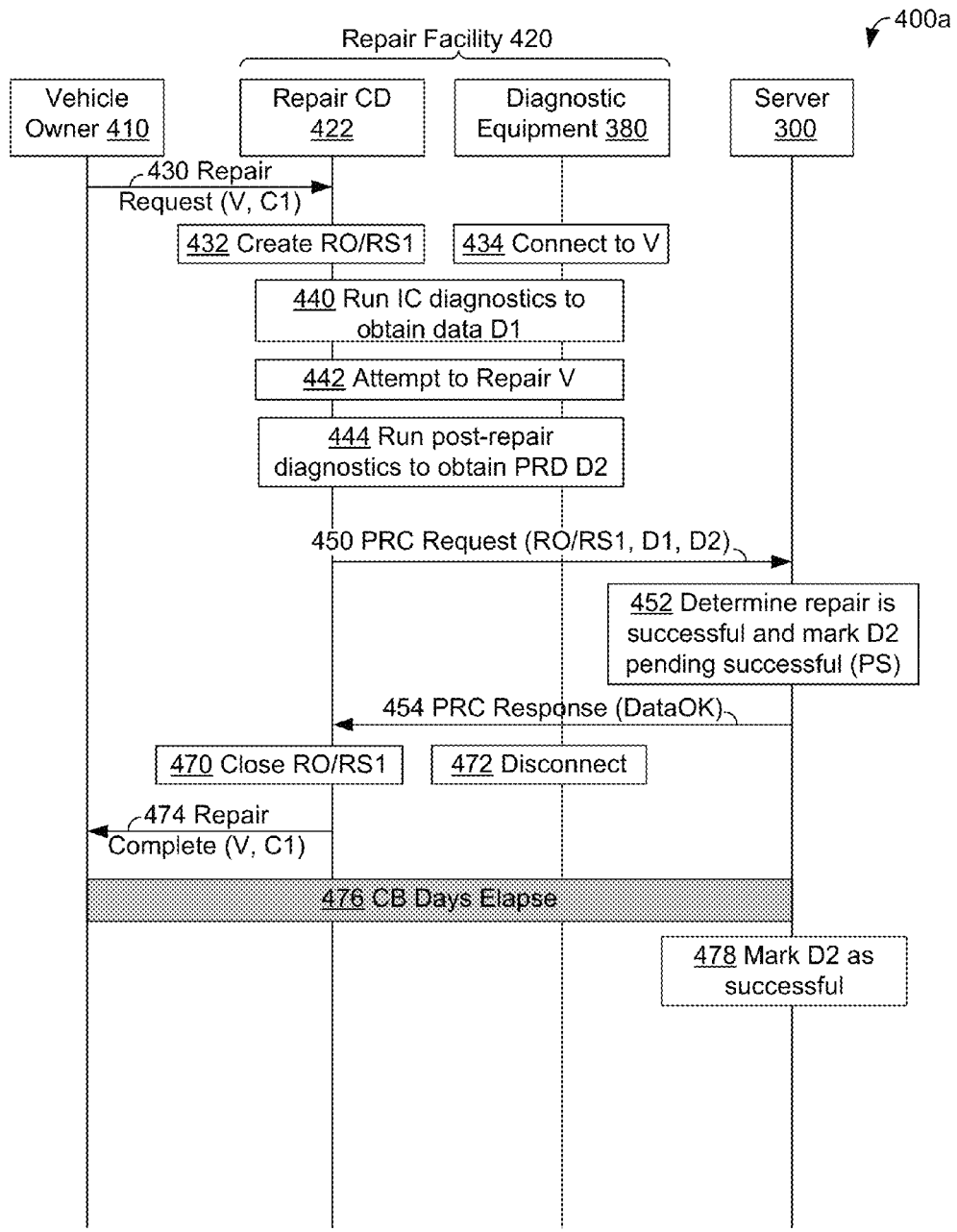
FIGS. 4A and 4B each show an example repair scenario, in accordance with an embodiment.

FIG. 4A shows repair scenario 400, in accordance with an embodiment. Scenario 400 involves vehicle owner 410 who owns vehicle V having complaint C1, repair facility 420 that includes diagnostic equipment 380 and a repair computing device (CD) 422 that can be used to enter, store, communicate, and process repair orders and perhaps other repair-related information; e.g., create, read, update, and delete repair orders, and server 300.

Scenario 400 begins at 430 where vehicle owner 410 brings vehicle V to have repair facility 420 address complaint C1 with vehicle V. Then, at block 432, repair computing device 422 can create a repair order and/or repair session RO/RS1 to address complaint C1 with vehicle V. At block 434, one or more technicians of repair facility 420 can connect vehicle V to diagnostic equipment 380.

Once connected, at block 440, computing device 422 and/or diagnostic equipment 380 can conduct initial condition (IC) diagnostics to obtain initial condition data D1. For example, initial condition data D1 can be an instance of initial condition data described above with respect to block 110 of FIG. 1.

At block 442, computing device 422 and/or diagnostic equipment 380 can be used to attempt repair of vehicle V to address complaint C1.

At block 444, computing device 422 and/or diagnostic equipment 380 can be used to obtain post-repair data D2, at least in part by running post-repair diagnostics. Post-repair data D2 can be an instance of post-repair data PRD described above with respect to block 126 of FIG. 1.

Upon completion of block 444, computing device 422 can generate post-repair comparison request 450 with some or all of the information from repair order/repair session RO/RS1, initial condition data D1, and post-repair data D2. Once generated, computing device 422 can send post-repair comparison request 450 to server 300.

In some embodiments, computing device 422 and/or diagnostic equipment 380 can adjust post-repair data D2 based on initial condition data D1, such as discussed above in the context of block 128 of FIG. 1. In scenario 400, server 300 performs any adjustments to post-repair data D2 based on initial condition data D1, such as discussed above in the context of block 128 of FIG. 1. In other embodiments, server 300 can store D1 as initial condition and/or as part of post-repair data D2. In still other embodiments, diagnostic equipment 380, rather than computing device 422, can generate and/or send post-repair comparison request 450 to server 300.

At block 452, server 300 can match post-repair data D2 with recorded data; e.g., data in post-repair database 338, such as discussed above in the context of block 130 of FIG. 1. Server 300 can make a determination whether data values in post-repair data D2 indicate whether the repair performed at block 442 was successful, such as discussed above in the context of block 140 of FIG. 1.

In scenario 400, server 300 can determine that the repair performed at block 442 was successful based on matches of post-repair data D2 with data related to complaint C1. Then, server 300 can store post-repair data D2 as pending successful (PS) data, such as discussed above in the context of block 160.

After completing block 452, server 300 can generate and send post-repair comparison response 454 to computing device 422 to convey the determination that that the repair performed at block 442 was successful based on matches of post-repair data D2. For example, post-repair comparison response 454 can be a post-repair comparison report similar to post-repair comparison report 380 of FIG. 3B. Other post-repair comparison responses are discussed above in the context of FIG. 3A. In some embodiments, server 300 can generate and send post-repair comparison response 454 to diagnostic equipment 380, rather than computing device 422. In other embodiments, server 300 can generate and send post-repair comparison response 454 to diagnostic equipment 380 and computing device 422. In other scenarios, upon reception of post-repair comparison response 454, computing device 422 can forward on post-repair comparison response 454 to diagnostic equipment 380 (or vice versa in some embodiments)

At block 470, as the repair attempted at block 442 is indicated to be successful, computing device 422 can be used to close repair order/repair session RS1. At block 472, diagnostic equipment 380 can be disconnected from vehicle V.

Then, computing device 422 or other component(s) of repair facility 420 can be used to provide repair complete information 474 to vehicle owner 410, indicating that that repairs to vehicle V are complete and that complaint C is addressed. For example, repair complete information 474 can include some or all of repair order/repair session RS1 and/or some or all of post-repair comparison response 454; e.g., a copy of the repair order for vehicle owner 410 and/or information indicating that the repair performed at block 442 has been indicated to be successful by server 300.

At block 476, passage of at least CB days is indicated, where CB is a threshold number of days to indicate whether or not post-repair data D2 is related to a comeback repair. In scenario 400, no comeback or other repairs related to complaint C1 of vehicle V are requested and no other factors related to a determination of a comeback, such as discussed above in the context of block 150 of FIG. 1, are present. Therefore, at block 478, server 300 can reclassify post-repair data D2 as successful post-repair data; e.g., as discussed above in the context of block 160 of FIG. 1. Scenario 400 can terminate upon completion of block 478.

Figure 4B:
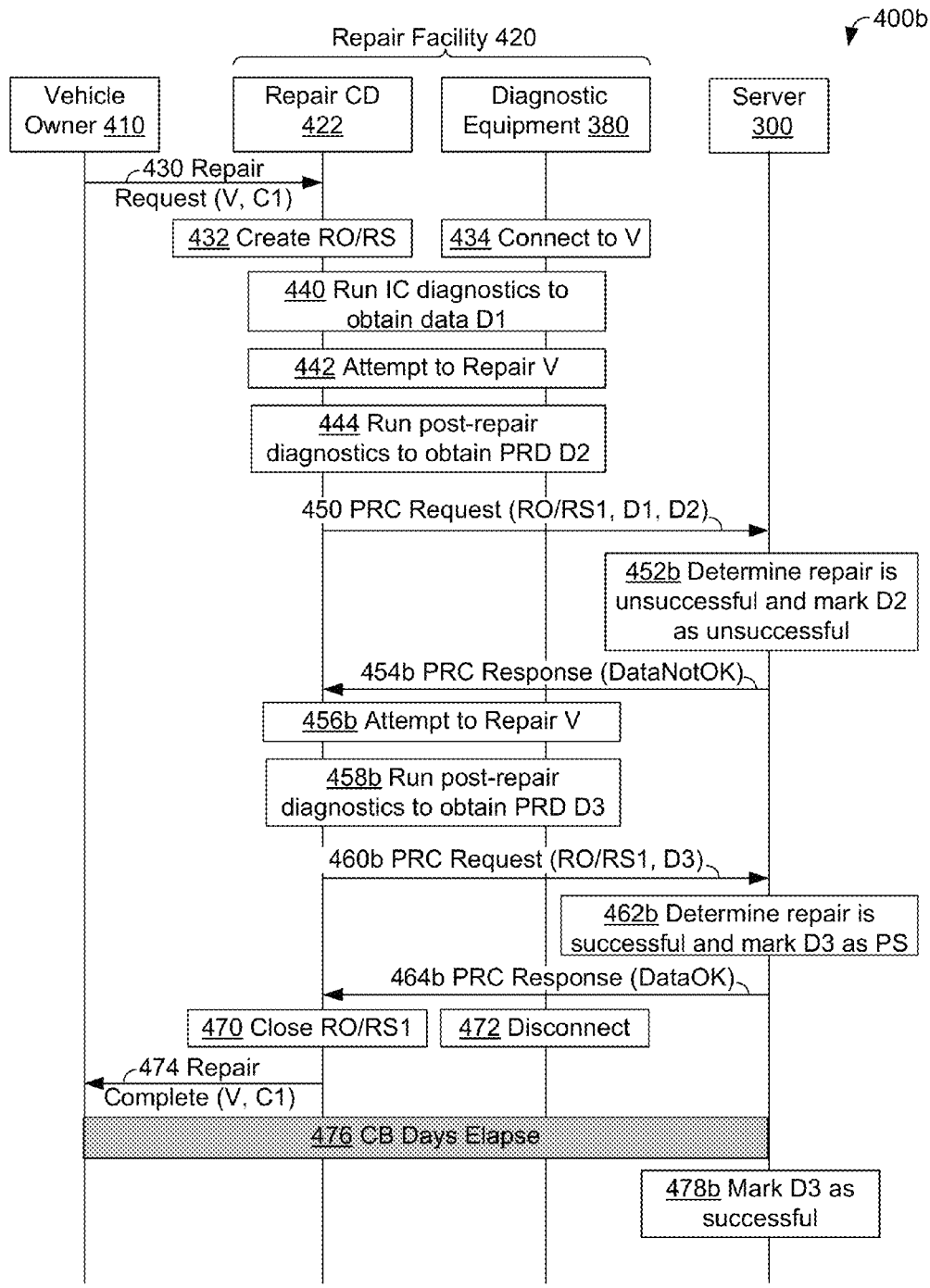

FIG. 4B shows repair scenario 400b, in accordance with an embodiment. Repair scenario 400b is related to repair scenario 400. Items shown in FIG. 4B share the same reference number as in FIG. 4A are as described in FIG. 4A—items with different reference numbers in FIG. 4B include a letter "b" as a suffix. Scenarios 400 and 400b are the same up through and including the sending of post-repair compare request 450 to server 300.

Then, scenario 400b continues at block 452b, where server 300 can match post-repair data D2 with recorded data related to complaint C1, such as discussed above in the context of block 130 of FIG. 1. Server 300 can make a determination whether data values in post-repair data D2 indicate whether the repair performed at block 442 was successful, such as discussed above in the context of block 140 of FIG. 1.

In scenario 400b, server 300 can determine that the repair performed at block 442 was unsuccessful based on matches of post-repair data D2. Then, server 300 can store post-repair data D2 as unsuccessful data, such as discussed above in the context of block 142.

After completing block 452b, server 300 can generate and send post-repair comparison response 454b to computing device 422 to convey the determination that that the repair performed at block 442 was unsuccessful based on matches of post-repair data D2. For example, post-repair comparison response 454b can be a post-repair comparison report similar to post-repair comparison report 380 of FIG. 3B. Other post-repair comparison responses are discussed above in the context of FIG. 3A.

At block 456b, after receiving unsuccessful post-repair comparison response 454b, computing device 422 and/or diagnostic equipment 380 can be used to attempt repair of vehicle V to address complaint C1. In scenario 400b, post-repair comparison response 454b included a suggested repair to address complaint C1 and the suggested repair is carried out at block 456b.

At block 458a, computing device 422 and/or diagnostic equipment 380 can be used to obtain post-repair data D3, at least in part by running post-repair diagnostics. Post-repair data D3 can be an instance of post-repair data PRD described above with respect to block 126 of FIG. 1.

Upon completion of block 458a, computing device 422 can generate post-repair comparison request 460b with some or all of the information from repair order/repair session RO/RS1 and post-repair data D3. Once generated, computing device 422 can send post-repair comparison request 460b to server 300, such as discussed above the context of FIG. 4A.

At block 462b, server 300 can match post-repair data D3 with recorded data related to complaint C1, determine that the repair attempted at block 456b was successful based on matches of post-repair data D3, and store post-repair data D3 as pending successful data, such as discussed above in the context of block 452 of FIG. 4A.

After completing block 462b, server 300 can generate and send post-repair comparison response 464b to computing device 422 to convey the determination that that the repair attempted at block 456b was successful based on matches of post-repair data D2, such as discussed above in the context of post-repair comparison response 454 of FIG. 4A.

At block 470, as the repair attempted at block 456b is indicated to be successful, computing device 422 can be used to close repair order/repair session RS1. At block 472, diagnostic equipment 380 can be disconnected from vehicle V.

Then, computing device 422 or other component(s) of repair facility 420 can be used to provide repair complete information 474 to vehicle owner 410, indicating that that repairs to vehicle V are complete and that complaint C is addressed. For example, repair complete information 474 can include some or all of repair order/repair session RS1 and/or some or all of post-repair comparison response 454; e.g., a copy of the repair order for vehicle owner 410 and/or information indicating that the repair performed at block 442 has been indicated to be successful by server 300.

At block 476, passage of at least CB days is indicated, where CB is a threshold number of days to indicate whether or not post-repair data D2 and/or D3 is related to a comeback. In scenario 400, no comeback or other repairs related to complaint C1 of vehicle V are requested and no other factors related to a determination of a comeback, such as discussed above in the context of block 150 of FIG. 1, are present. Therefore, at block 478b, server 300 can reclassify post-repair data D3 as successful post-repair data; e.g., as discussed above in the context of block 160 of FIG. 1. Scenario 400b can terminate upon completion of block 478b.

Figure 5A:
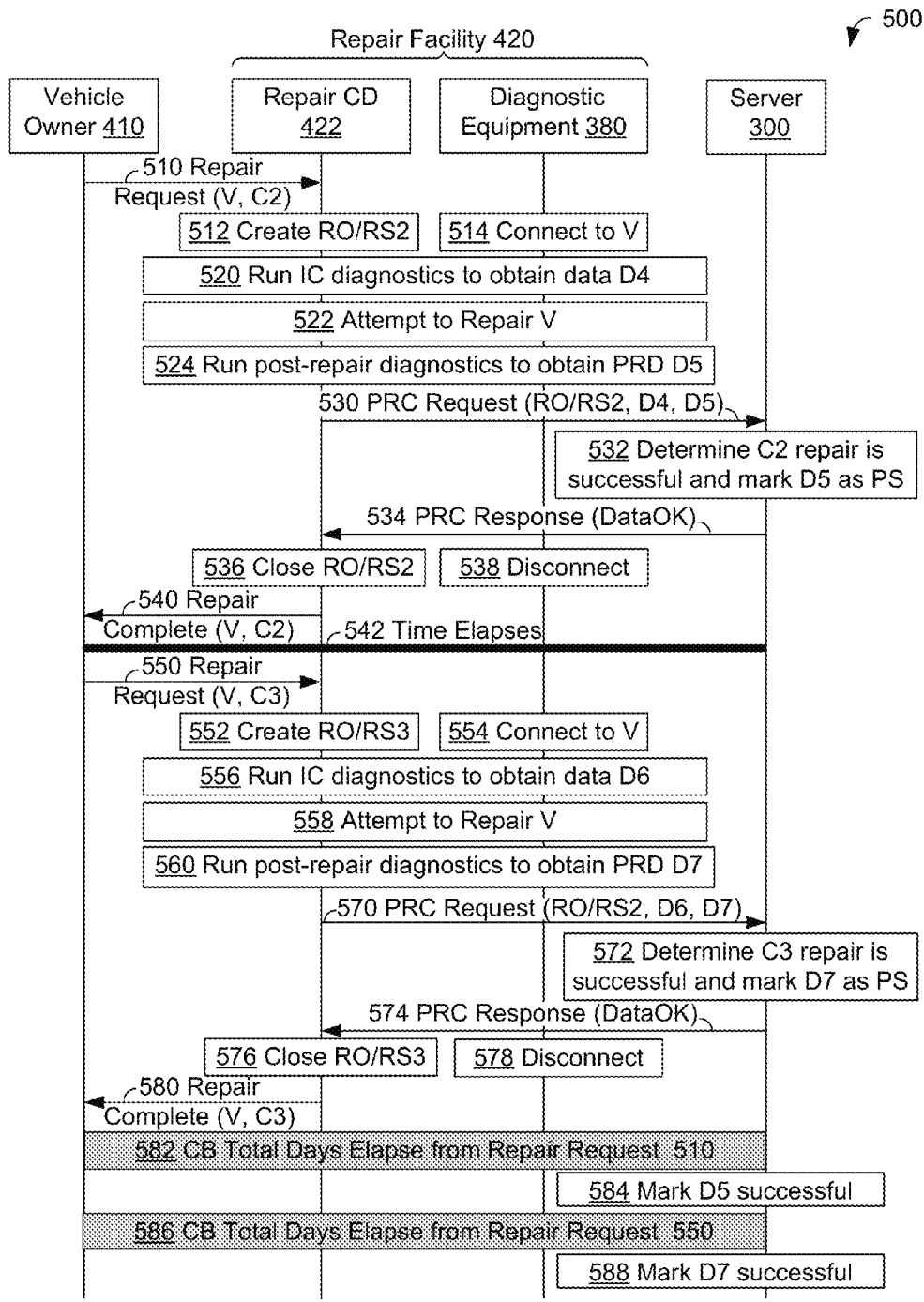
FIGS. 5A and 5B each show an example repair scenario, in accordance with an embodiment.

FIG. 5A shows repair scenario 500, in accordance with an embodiment. Scenario 400 involves vehicle owner 410 who owns vehicle V having complaint C2 and a subsequent complaint C3, repair facility 420 that includes diagnostic equipment 380 and a repair computing device 422 that can be used to enter, store, communicate, and process repair orders and perhaps other repair-related information; e.g., create, read, update, and delete repair orders, and server 300.

Scenario 500 begins at 510 where vehicle owner 410 brings vehicle V to have repair facility 420 address complaint C2 with vehicle V. Then, at block 512, repair computing device 422 can create a repair order and/or repair session RO/RS2 to address complaint C2 with vehicle V. At block 514, one or more technicians of repair facility 420 can connect vehicle V to diagnostic equipment 380.

Once connected, at block 520, computing device 422 and/or diagnostic equipment 380 can conduct initial condition diagnostics to obtain initial condition data D4. For example, initial condition data D4 can be an instance of initial condition data described above with respect to block 110 of FIG. 1.

At block 522, computing device 422 and/or diagnostic equipment 380 can be used to attempt repair of vehicle V to address complaint C2.

At block 524, computing device 422 and/or diagnostic equipment 380 can be used to obtain post-repair data D5, at least in part by running post-repair diagnostics. Post-repair data D5 can be an instance of post-repair data PRD described above with respect to block 126 of FIG. 1.

Upon completion of block 524, computing device 422 can generate and send post-repair comparison request 530, such as described above in the context of post-repair comparison request 450 of FIG. 4A.

At block 532, server 300 can match post-repair data D5 with recorded data related to complaint C2, such as discussed above in the context of block 130 of FIG. 1. Server 300 can make a determination whether data values in post-repair data D5 indicate whether the repair performed at block 522 was successful, such as discussed above in the context of block 140 of FIG. 1.

In scenario 500, server 300 can determine that the repair performed at block 522 was successful based on matches of post-repair data D5. Then, server 300 can store post-repair data D5 as pending successful data, such as discussed above in the context of block 160.

After completing block 532, server 300 can generate and send post-repair comparison response 534 to computing device 422 with some or all of the information related to repair order and/or repair session RO/RS2, initial conditions data D4, and post-repair data D5, such as described above in the context of post-repair comparison response 454 of FIG. 4A.

At block 536, as the repair attempted at block 522 is indicated to be successful, computing device 422 can be used to close repair order/repair session RS2. At block 538, diagnostic equipment 380 can be disconnected from vehicle V.

Then, computing device 422 or other component(s) of repair facility 420 can be used to provide repair complete information 540 to vehicle owner 410, such as discussed above in the context of repair complete information 474 of FIG. 4A.

After providing repair complete information 540, time elapses at 542 as indicated by the bar drawn across FIG. 5A. In scenario 500, the amount of elapsed time at 542 is less than CB days, where CB is a threshold number of days to indicate whether or not post-repair data is related to a comeback repair.

Scenario 500 continues at 550 where vehicle owner 410 brings vehicle V to have repair facility 420 address complaint C3 with vehicle V. Then, at block 552, repair computing device 422 can create a repair order and/or repair session RO/RS3 to address complaint C3 with vehicle V. In scenario 500, complaint C3 is unrelated to C2. Therefore, repair order and/or repair session RO/RS3 is not considered to be related to a comeback repair. At block 554, one or more technicians of repair facility 420 can connect vehicle V to diagnostic equipment 380.

Once connected, at block 556, computing device 422 and/or diagnostic equipment 380 can conduct initial condition diagnostics to obtain initial condition data D6. For example, initial condition data D6 can be an instance of initial condition data described above with respect to block 110 of FIG. 1.

At block 558, computing device 422 and/or diagnostic equipment 380 can be used to attempt repair of vehicle V to address complaint C3.

At block 560, computing device 422 and/or diagnostic equipment 380 can be used to obtain post-repair data D7, at least in part by running post-repair diagnostics. Post-repair data D7 can be an instance of post-repair data PRD described above with respect to block 126 of FIG. 1.

Upon completion of block 560, computing device 422 can generate and send post-repair comparison request 570 with some or all of the information related to repair order and/or repair session RO/RS3, initial conditions data D6, and post-repair data D7, such as described above in the context of post-repair comparison request 450 of FIG. 4A.

At block 572, server 300 can match post-repair data D7 with recorded data related to complaint C3, such as discussed above in the context of block 130 of FIG. 1. Server 300 can make a determination whether data values in post-repair data D7 indicate whether the repair performed at block 558 was successful, such as discussed above in the context of block 140 of FIG. 1.

In scenario 500, server 300 can determine that the repair performed at block 558 was successful based on matches of post-repair data D7. Then, server 300 can store post-repair data D7 as pending successful data, such as discussed above in the context of block 160.

After completing block 572, server 300 can generate and send post-repair comparison response 574 to computing device 422, such as described above in the context of post-repair comparison response 454 of FIG. 4A.

At block 576, as the repair attempted at block 558 is indicated to be successful, computing device 422 can be used to close repair order/repair session RS3. At block 578, diagnostic equipment 380 can be disconnected from vehicle V.

Then, computing device 422 or other component(s) of repair facility 420 can be used to provide repair complete information 580 to vehicle owner 410, such as discussed above in the context of repair complete information 474 of FIG. 4A.

After providing repair complete information 580, passage of at least CB days from a time of repair request 510 is indicated by block 582 of FIG. 5A. In scenario 500, no comeback or other repairs related to complaint C2 of vehicle V are requested and no other factors related to a determination of a comeback, such as discussed above in the context of block 150 of FIG. 1, are present. Therefore, at block 584, server 300 can reclassify post-repair data D5 as successful post-repair data; e.g., as discussed above in the context of block 160 of FIG. 1.

FIG. 5A indicates, at block 586, passage of at least CB days from a time of repair request 550. In scenario 500, no comeback or other repairs related to complaint C3 of vehicle V are requested and no other factors related to a determination of a comeback, such as discussed above in the context of block 150 of FIG. 1, are present. Therefore, at block 588, server 300 can reclassify post-repair data D7 as successful post-repair data; e.g., as discussed above in the context of block 160 of FIG. 1. Scenario 500 can terminate upon completion of block 588.

Figure 5B:
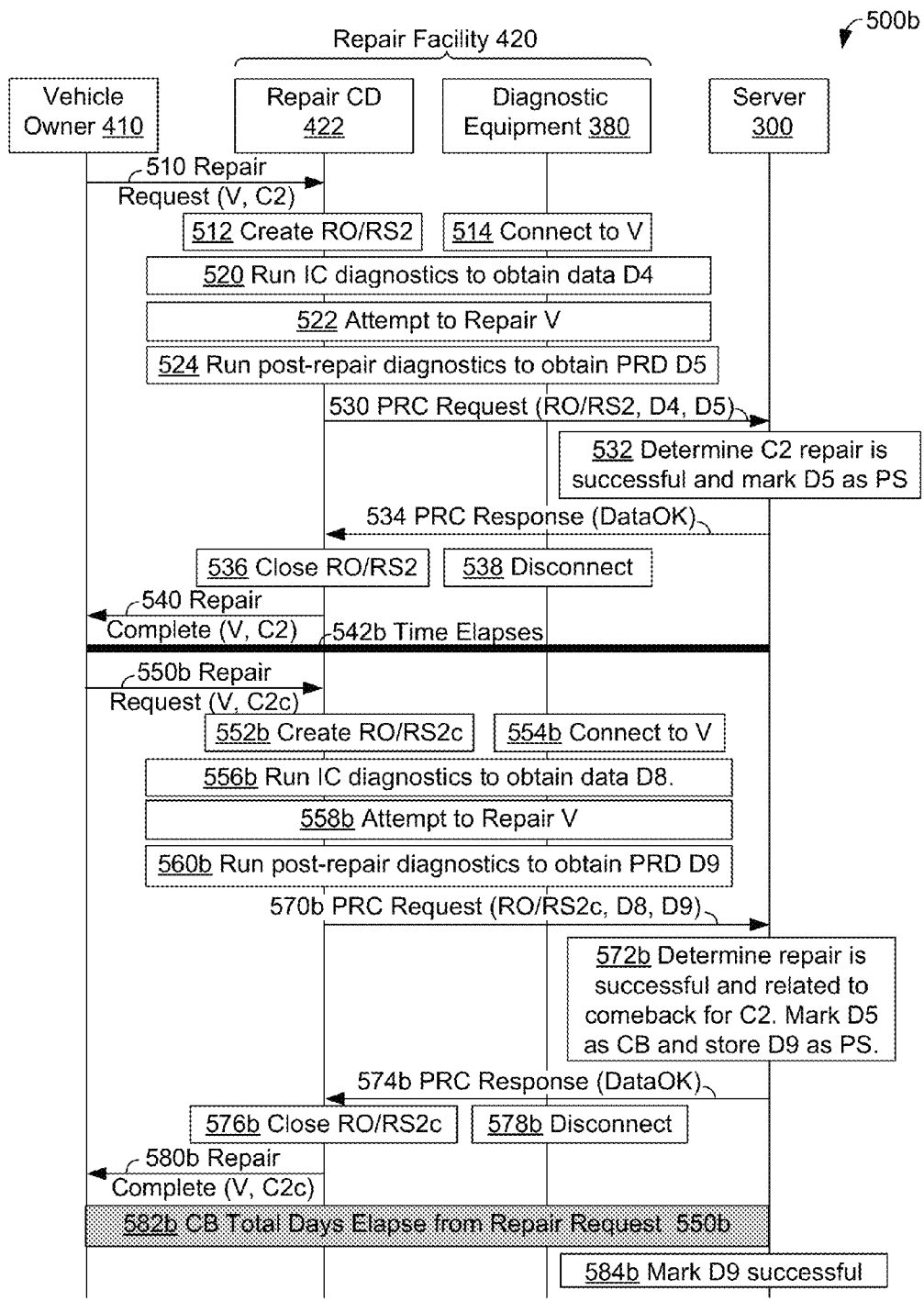

FIG. 5B shows repair scenario 500b, in accordance with an embodiment. Repair scenario 500b is related to repair scenario 500. Items shown in FIG. 5B share the same reference number as in FIG. 5A are as described in FIG. 5A—items with different reference numbers in FIG. 5B include a letter "b" as a suffix. Scenarios 500 and 500b are the same up through and including providing repair complete information 540 to vehicle owner 410.

Then, after providing repair complete information 540, time elapses at 542b in scenario 500b as indicated by the bar drawn across FIG. 5B. In scenario 500b, the amount of elapsed time at 542b is less than CB days, where CB is a threshold number of days to indicate whether or not post-repair data is related to a comeback repair.

Scenario 500b continues at 550b where vehicle owner 410 brings vehicle V to have repair facility 420 address comeback-related complaint C2c with vehicle V. Then, at block 552, repair computing device 422 can create a repair order and/or repair session RO/RS2c to address complaint C2c with vehicle V. In scenario 500b, complaint C2c is a comeback-related complaint to original complaint C2. Therefore, repair order and/or repair session RO/RS2c can be considered to be related to a comeback repair. In scenario 500b, repair order and/or repair session RO/RS2c includes an indication of being related to a comeback repair.

In some embodiments, rather than creating repair order and/or repair session RO/RS2c related to repairs to address complaint C2c, repair order and/or repair session RO/RS2 can be extended to relate to repairs to address complaint C2c and/or modified to indicate that RO/RS2 is a comeback-related order.

At block 554b, one or more technicians of repair facility 420 can connect vehicle V to diagnostic equipment 380. Once connected, at block 556b, computing device 422 and/or diagnostic equipment 380 can conduct initial condition diagnostics to obtain initial condition data D8. For example, initial condition data D8 can be an instance of initial condition data described above with respect to block 110 of FIG. 1.

At block 558*b*, computing device 422 and/or diagnostic equipment 380 can be used to attempt repair of vehicle V to address complaint C2c.

At block 560*b*, computing device 422 and/or diagnostic equipment 380 can be used to obtain post-repair data D9, at least in part by running post-repair diagnostics. Post-repair data D9 can be an instance of post-repair data PRD described above with respect to block 126 of FIG. 1.

Upon completion of block 560*b*, computing device 422 can generate and send post-repair comparison request 570*b* with some or all of the information related to repair order and/or repair session RO/RS2c, initial conditions data D8, and post-repair data D9, such as described above in the context of post-repair comparison request 450 of FIG. 4A.

At block 572*b*, server 300 can match post-repair data D9 with recorded data related to complaint C2c, such as discussed above in the context of block 130 of FIG. 1. Server 300 can make a determination whether data values in post-repair data D9 indicate whether the repair performed at block 558*b* was successful, such as discussed above in the context of block 140 of FIG. 1. In scenario 500*b*, server 300 can determine that the repair performed at block 558*b* was successful based on matches of post-repair data D9. Then, server 300 can store post-repair data D7 as pending successful data, such as discussed above in the context of block 160.

Server 300 can also determine that vehicle V was returned for a comeback repair as requested by repair request 550*b*, such as discussed above in the context of block 150 of FIG. 1. Then, server 300 can classify post-repair data D5 associated with repair 522 of scenario 500*b* as comeback-related (CB) post-repair data as indicated at block 152 of FIG. 1, as repair 522 is now known to have led to the comeback repair requested by repair request 550*b*.

After completing block 572*b*, server 300 can generate and send post-repair comparison response 574*b* to computing device 422, such as described above in the context of post-repair comparison response 454 of FIG. 4A.

At block 576*b*, as the repair attempted at block 558*b* is indicated to be successful, computing device 422 can be used to close repair order/repair session RS2c. At block 578*b*, diagnostic equipment 380 can be disconnected from vehicle V.

Then, computing device 422 or other component(s) of repair facility 420 can be used to provide repair complete information 580*c* to vehicle owner 410, such as discussed above in the context of repair complete information 474 of FIG. 4A.

After providing repair complete information 580*c*, passage of at least CB days from a time of repair request 550*b* is indicated by block 582*b* of FIG. 5A. In scenario 500*b*, no comeback or other repairs related to complaint C2 or C2c of vehicle V are requested and no other factors related to a determination of an (additional) comeback, such as discussed above in the context of block 150 of FIG. 1, are present. Therefore, at block 584*b*, server 300 can reclassify post-repair data D9 as successful post-repair data; e.g., as discussed above in the context of block 160 of FIG. 1. Scenario 500*b* can terminate upon completion of block 584*b*.

Example Computing Network

Figure 6:
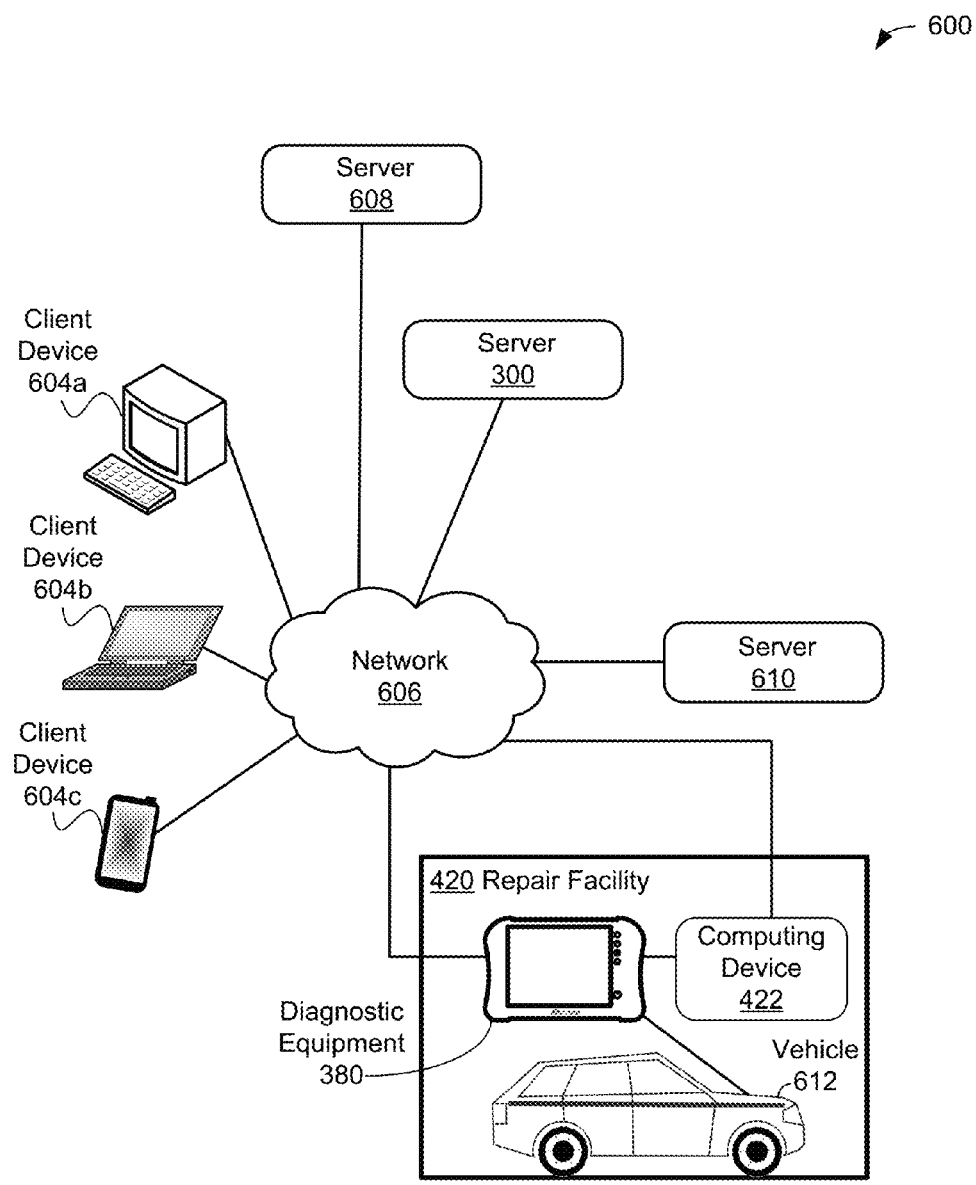
FIG. 6 is a block diagram of an example computing network, in accordance with an embodiment.

FIG. 6 is a block diagram of example computing network 600 in accordance with an example embodiment. In FIG. 6, servers 300, 608, and 610 are configured to communicate, via a network 606, with diagnostic equipment 380 and computing device 422 of repair facility 420, as well as with client devices 604*a*, 604*b*, and 604*c*. As shown in FIG. 6, client devices can include a personal computer 604*a*, a laptop computer 604*b*, and a smart-phone 604*c*. More generally, client devices 604*a*-604*c* (or any additional client devices) can be any sort of computing device, such as a workstation, network terminal, desktop computer, laptop computer, wireless communication device (e.g., a cell phone or smart phone), and so on. Server 300 is discussed above in the context of at least FIGS. 3A and 4A-5B. Repair facility 420, including diagnostic equipment 380 and computing device 422 is also discussed above in the context of at least FIGS. 3B and 4A-5B. In the context of computing network 600, computing device 422 and diagnostic equipment 380 can each act as a client device.

Network 606 can correspond to a local area network, a wide area network, a corporate intranet, the public Internet, combinations thereof, or any other type of network(s) configured to provide communication between networked computing devices. In some embodiments, part or all of the communication between networked computing devices can be secured.

Servers 300, 608, and 610 can share content and/or provide content to diagnostic equipment 380, computing device 422, and client devices 604*a*-604*c*. As shown in FIG. 6, servers 300, 608, and 610 are not physically at the same location. Alternatively, some or all servers 300, 608, and 610 can be co-located, and/or can be accessible via one or more networks separate from network 606. Although FIG. 6 shows five client devices and three servers, network 606 can service more or fewer than five client devices and/or more or fewer than three servers. In some embodiments, one or more of servers 300, 608, 610 can perform some or all of the herein-described methods; e.g., methods 100 and/or 800.

Example Computing Device

Figure 7A:
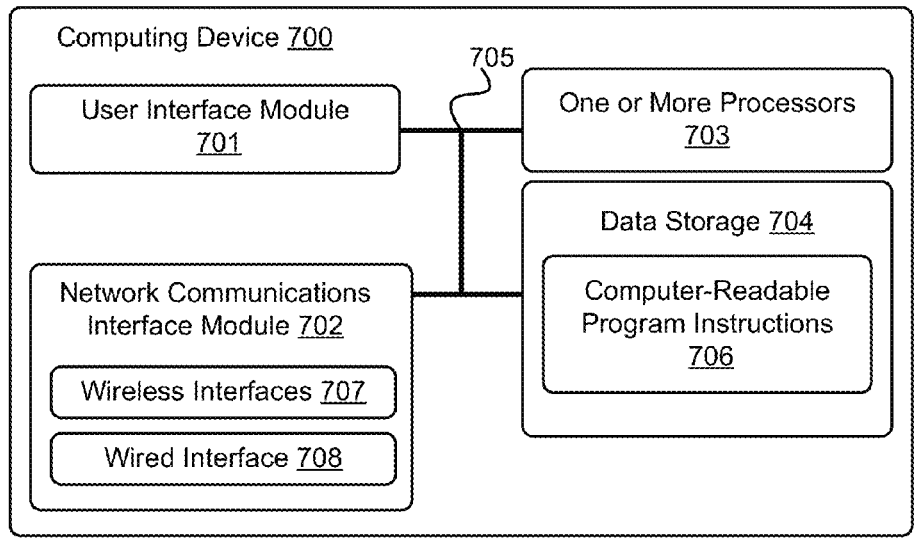
FIG. 7A is a block diagram of an example computing device, in accordance with an embodiment.

FIG. 7A is a block diagram of an example computing device 700 including user interface module 701, network communication interface module 702, one or more processors 703, and data storage 704, in accordance with an embodiment.

In particular, computing device 700 shown in FIG. 7A can be configured to perform one or more functions of, server 300, diagnostic equipment 380, computing device 422, client devices 604*a*-604*c*, network 606, and/or servers 608, 610 and/or one or more functions of method 100 and/or method 800. Computing device 700 may include a user interface module 701, a network communication interface module 702, one or more processors 703, and data storage 704, all of which may be linked together via a system bus, network, or other connection mechanism 705.

Figure 8:
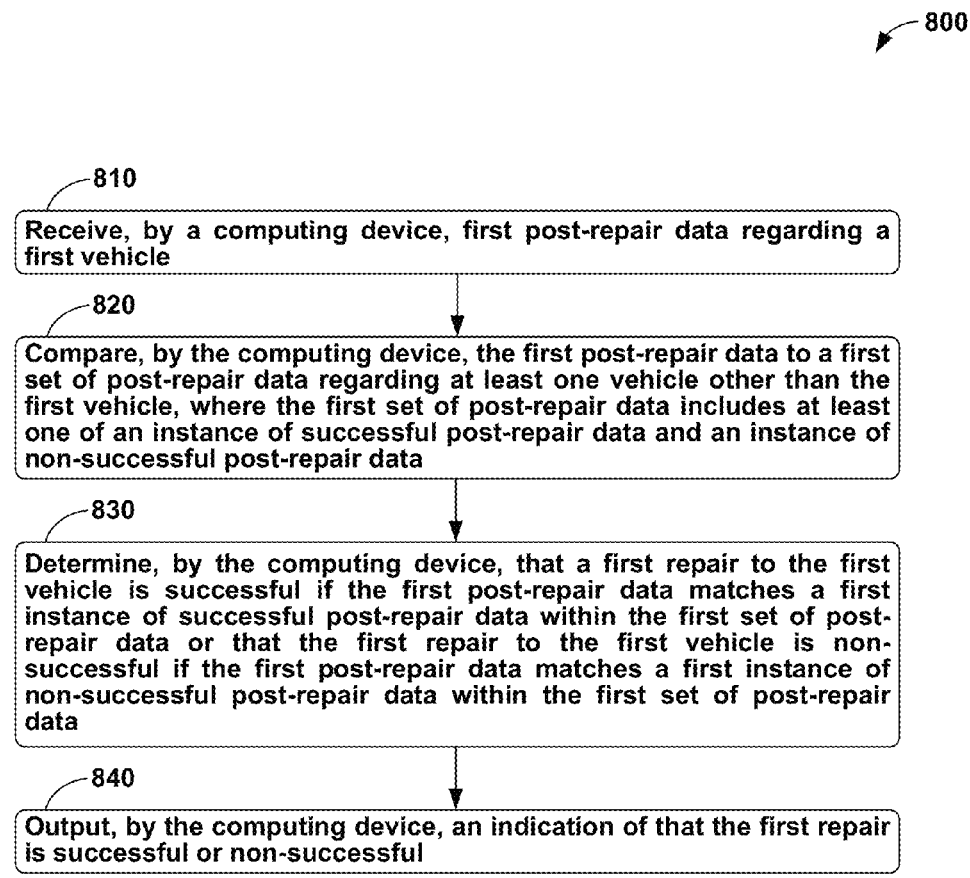
FIG. 8 is a flow chart of an example method, in accordance with an embodiment.

Computing device 700 can be a desktop computer, laptop or notebook computer, personal data assistant (PDA), mobile phone, embedded processor, touch-enabled device, or any similar device that is equipped with at least one processing unit capable of executing machine-language instructions that implement at least part of the herein-described techniques and methods, including, but not limited to, method 100 described with respect to FIG. 1 and/or method 800 described with respect to FIG. 8.

User interface 701 can receive input and/or provide output, perhaps to a user. User interface 701 can be configured to send and/or receive data to and/or from user input from input device(s), such as a keyboard, a keypad, a touch screen, a computer mouse, a track ball, a joystick, and/or other similar devices configured to receive input from a user of the computing device 700.

User interface 701 can be configured to provide output to output display devices, such as one or more cathode ray tubes (CRTs), liquid crystal displays (LCDs), plasma devices, light emitting diodes (LEDs), displays using digital light processing (DLP) technology, printers, light bulbs, and/or other similar devices capable of displaying graphical, textual, and/or numerical information to a user of computing device 700. User interface module 701 can also be configured to generate audible output(s), such as a speaker, speaker jack, audio output port, audio output device, earphones, and/or other similar devices configured to convey sound and/or audible information to a user of computing device 700.

Network communication interface module 702 can be configured to send and receive data over wireless interface 707 and/or wired interface 708 via a network, such as network 606. Wireless interface 707 if present, can utilize an air interface, such as a Bluetooth®, Wi-Fi®, ZigBee®, and/or WiMAX™ interface to a data network, such as a wide area network (WAN), a local area network (LAN), one or more public data networks (e.g., the Internet), one or more private data networks, or any combination of public and private data networks. Wired interface(s) 708, if present, can comprise a wire, cable, fiber-optic link and/or similar physical connection(s) to a data network, such as a WAN, LAN, one or more public data networks, one or more private data networks, or any combination of such networks.

In some embodiments, network communication interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 703 can include one or more central processing units, computer processors, mobile processors, digital signal processors (DSPs), graphics processing units (GPUs), microprocessors, computer chips, and/or other processing units configured to execute machine-language instructions and process data. Processor(s) 703 can be configured to execute computer-readable program instructions 706 that are contained in data storage 704 and/or other instructions as described herein.

Data storage 704 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 704 can include one or more physical and/or non-transitory storage devices with at least enough combined storage capacity to contain computer-readable program instructions 706 and any associated/related data and data structures.

In embodiments of the disclosure in which a computer software product is used, the product may be non-transitory and store instructions on one or more physical media and/or devices, such as a DVD, a solid state drive, a hard drive, or any other non-transitory computer-readable media or storage devices disclosed herein. Alternatively, the product may be transitory and in the form of instructions provided over a connection such as a network connection which is linked to a network such as the Internet.

Computer-readable program instructions 706 and any data structures contained in data storage 704 include computer-readable program instructions executable by processor(s) 703 and any storage required, respectively, to perform at least part of herein-described methods, including, but not limited to, method 100 described with respect to FIG. 1 and/or method 800 described with respect to FIG. 8, and/or to perform some or all of the functionality described herein with respect to at least post-repair comparison software 310 and/or user interface 382.

Figure 7B:
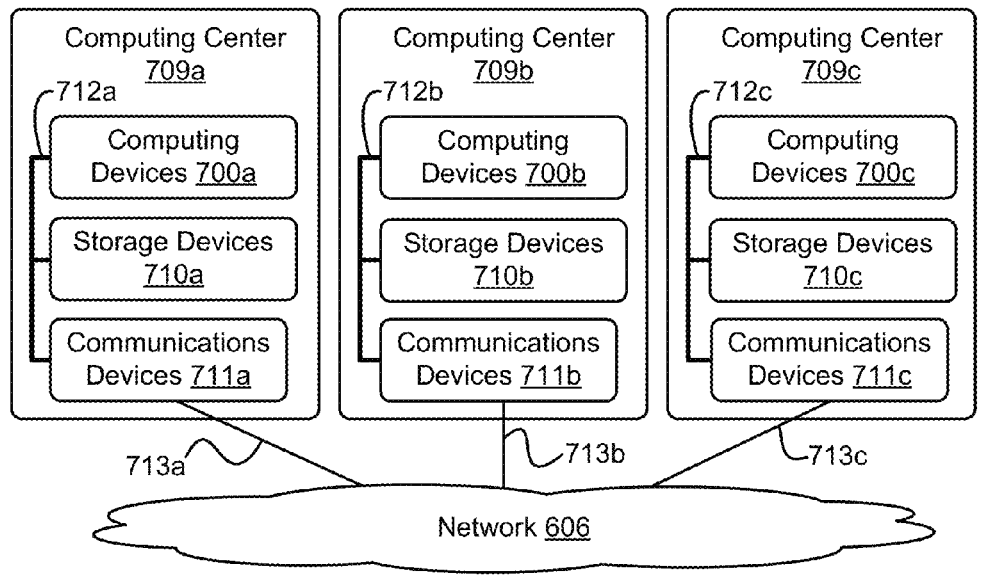
FIG. 7B depicts an example network of computing centers, in accordance with an embodiment.

FIG. 7B depicts a network 606 of computing centers 709a, 709b, 709c in accordance with an example embodiment. Data and/or software for server 300 can be stored on one or more cloud-based devices that store program logic and/or data of cloud-based applications and/or services. In some embodiments, server 300 can be a single computing device residing in a single computing center. In other embodiments, server 300 can include multiple computing devices in a single computing center, or even multiple computing devices located in multiple computing centers located in diverse geographic locations.

In some embodiments, data and/or software for server 300 can be encoded as computer readable information stored in computer readable media and/or non-transitory computer readable storage media and accessible by client devices 604a, 604b, and 604c, and/or other computing devices (e.g., diagnostic equipment 380, computing device 422). In some embodiments, data and/or software for server 300 can be stored on a single disk drive or other non-transitory and/or tangible storage media, or can be implemented on multiple disk drives or other non-transitory and/or tangible storage media located at one or more diverse geographic locations.

FIG. 7B depicts a cloud-based server system in accordance with an example embodiment. In FIG. 7B, the functions of server 300 can be distributed among three computing centers 709a, 709b, and 708c. Computing center 709a can include one or more computing devices 700a, storage devices 710a, and communication devices 711a (e.g., router(s), hub(s), switch(es)) connected by local network 712a. Similarly, computing center 709b can include one or more computing devices 700b, storage devices 710b, and communication devices 711b connected by local network 712b. Likewise, computing center 709c can include one or more computing devices 700c, storage devices 710c, and communication devices 711c connected by local network 712c.

In some embodiments, each of computing centers 709a, 709b, and 709c can have equal numbers of computing, storage, and communication devices. In other embodiments, however, each computing center can have different numbers of computing, storage, and/or communication devices. The number of computing, storage, and communication devices in each computing center can depend on the computing task or tasks assigned to each computing center.

In computing center 709a, for example, computing devices 700a can be configured to perform various computing tasks of server 300. In one embodiment, the various functionalities of server 300 can be distributed among one or more of computing devices 700a, 700b, and 700c. Computing devices 700b and 700c in computing centers 709b and 709c can be configured similarly to computing devices 700a in computing center 709a. On the other hand, in some embodiments, computing devices 700a, 700b, and 700c can be configured to perform different functions.

In some embodiments, computing tasks and stored data associated with server 300 can be distributed across computing devices 700a, 700b, and 700c based at least in part on the processing requirements of server 300, the processing capabilities of computing devices 700a, 700b, and 700c, the latency of the network links between the computing devices in each computing center and between the computing centers themselves, and/or other factors that can contribute to the cost, speed, fault-tolerance, resiliency, efficiency, and/or other design goals of the overall system architecture.

The storage devices 710a, 710b, and 710c of computing centers 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the storage devices to protect against disk drive or other storage device failures and/or network failures that prevent one or more computing devices from accessing one or more storage devices.

Similar to the manner in which the functions of server 300 can be distributed across computing devices 700a, 700b, and 700c of computing centers 709a, 709b, and 709c, various active portions and/or backup portions of these components can be distributed across storage devices 710a, 710b, and 710c. For example, some storage devices can be configured to store one portion of the data and/or software of server 300, while other storage devices can store other, separate portions of the data and/or software of server 300. Additionally, some storage devices can be configured to store backup versions of data and/or software stored in other storage devices.

Communication devices 711a, 711b, and 711c can include networking equipment configured to provide internal and external communications for computing centers 709a, 709b, 709c. For example, communication devices 711a in computing center 709a can include one or more internet switching and routing devices configured to provide (i) local area network communications between computing devices 700a and storage devices 710a via local network 712a, and (ii) wide area network communications between computing center 709a and the computing facilities 709b and 709c via connection 713a to network 606. Communication devices 711b and 711c can include network equipment similar to communication devices 711a, and communication devices 711b and 711c can perform similar networking functions for computing centers 709b and 709b that communication devices 711a perform for computing center 709a.

In some embodiments, the configuration of communication devices 711a, 711b, and 711c can be based at least in part on the communication requirements of the computing devices and storage devices, the communications capabilities of network equipment in the communication devices 711a, 711b, and 711c, the latency and throughput of local networks 712a, 712b, 712c, the latency, throughput, and cost of connections 713a, 713b, and 713c, and/or other factors that can contribute to the cost, speed, throughput, fault-tolerance, resiliency, efficiency and/or other design goals for computing centers 709a, 709b, 709c.

Example Methods of Operation

FIG. 8 is a flow chart of an example method 800. Method 800 can be carried out by a computing device, such as computing device 700 discussed above in the context of FIG. 7A. In some embodiments, the computing device can be configured with some or all of post-repair comparison software 310 and/or be configured to perform some or all of the herein-described functionality of server 300.

Method 800 can be begin at block 810, where a computing device can receive first post-repair data regarding a first vehicle, such as described above in the context of at least FIGS. 3A and 4A-5B. In some embodiments, the first post-repair data regarding the first vehicle can be received after completion of the first repair to the first vehicle and prior to the first vehicle being returned to an owner of the first vehicle after completion of the first repair to the first vehicle.

In other embodiments, the first post-repair data can include data selected from the group consisting of: (i) serial data from an electronic control unit within the first vehicle, (ii) electrical measurement data from an electrical meter connected to the first vehicle, (iii) a graphical waveform from an oscilloscope connected to the first vehicle, and (iv) an On-Board Diagnostics II (OBD II) PID.

At block 820, the computing device can compare the first post-repair data to a first set of post-repair data regarding at least one vehicle other than the first vehicle. The first set of post-repair data can include at least one of an instance of successful post-repair data and an instance of non-successful post-repair data, such as described above in the context of at least FIGS. 3A and 4A-5B.

In some embodiments, the first post-repair data can be associated with a first repair order that includes first complaint data. Then, comparing the first post-repair data to the first set of post-repair data can include receiving, by the computing device, the first set of post-repair data, where the first set of post-repair data includes at least one instance of post-repair data associated with a repair order including complaint data that matches the first complaint data.

At block 830, the computing device can determine that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data, such as described above in the context of at least FIGS. 3A and 4A-5B.

At block 840, the computing device can output an indication that the first repair is successful or non-successful, such as described above in the context of at least FIGS. 3A and 4A-5B. In some embodiments, outputting the indication that the first repair is successful or non-successful can include outputting a likelihood that the first repair is successful. In other embodiments, outputting the indication that the first repair is successful or non-successful can include outputting a likelihood that the first repair is unsuccessful.

In some embodiments, method 800 can also include: receiving, by the computing device, a second repair order including second complaint data and a comeback indicator; and determining whether the first repair to the first vehicle is successful or non-successful based on the comeback indicator.

In other embodiments, method 800 can also include classifying, by the computing device, the first post-repair data as an instance of successful post-repair data in response to determining the first repair to the first vehicle is successful or as an instance of non-successful post-repair data in response to determining the first repair to the first vehicle is non-successful.

In even other embodiments, method 800 can also include: classifying, by the computing device, the first post-repair data as an instance of potentially-successful post-repair data in response to determining the first repair to the first vehicle is successful; determining, by the computing device, that an indication that the first repair to the first vehicle is non-successful has not been received after a pre-determined amount of time; and responsively reclassifying, by the computing device, the first post-repair data from an instance of potentially-successful post-repair data to an instance of successful post-repair data.

In further other embodiments, method 800 can also include: receiving, by the computing device, a first repair order associated with the first post-repair data, where the first repair order includes a first repair order entry including at least one of a complaint leading to the first repair, a cause leading to the first repair, and a correction indicating the first repair; classifying, by the computing device, the first post-repair data as an instance of successful post-repair data; after classifying the first post-repair data as an instance of successful post-repair data, receiving, by the computing device, second post-repair data regarding the first vehicle and a second repair order associated with the second post-repair data; and reclassifying, by the computing device, the first post-repair data from an instance of successful post-repair data to an instance of non-successful post-repair data based on the second repair order. In some of the further other embodiments, reclassifying the first post-repair data can be conditioned on receiving the second repair order within a predetermined amount of time after receiving the first repair order.

In other of the further other embodiments, the second repair order can include a comeback indicator. Then, reclassifying the first post-repair data from an instance of successful post-repair data to an instance of non-successful post-repair data based on the second repair order can include: determining whether the comeback indicator indicates the second repair order is a comeback repair; and after determining that the comeback indicator indicates that the second repair order is a comeback repair, reclassifying the first post-repair data from an instance of successful post-repair data to an instance of non-successful post-repair data based on the second repair order.

In even other of the further other embodiments, method 800 can also include: comparing, by the computing device, the second post-repair data to a second set of post-repair data regarding at least one vehicle other than the first vehicle, wherein the second set of post-repair data includes at least one of an instance of successful post-repair data and an instance of non-successful post-repair data; determining, by the computing device, that a second repair to the first vehicle is successful if the second post-repair data matches an instance of the successful post-repair data within the second set of post-repair data or that the second repair to the first vehicle is non-successful if the second post-repair data matches an instance of the non-successful post-repair data within the second set of post-repair data; and outputting, by the computing device, an indication that the second repair is successful or non-successful.

In additional embodiments, the computing device can determine the first repair to the first vehicle is non-successful and can output an indication the first repair is non-successful. Then, method 800 can also include: determining, by the computing device, a second instance of successful post-repair data that is associated with the first instance of non-successful post-repair data, wherein the first instance of the non-successful post-repair data is associated with a first repair order and the second instance of successful post-repair data is associated with a second repair order, and wherein each of the first repair order and the second repair order recite a common complaint; and outputting, by the computing device, a repair listed on the second repair order.

In particular of the additional embodiments, method 800 can also include: receiving, by the computing device, second post-repair data regarding the first vehicle; comparing, by the computing device, the second post-repair data to post-repair data associated with the second repair order; determining, by the computing device, the second post-repair data matches the post-repair data associated with the second repair order; and outputting, by the computing device, an indication that performing the repair listed on the second repair order to the first vehicle is successful.

In further additional embodiments, outputting the indication can include outputting an indication the repair is non-successful. Then, method 800 can also include: determining, by the computing device, a possible repair to the first vehicle; outputting, by the computing device, the possible repair to the first vehicle; receiving, by the computing device, second post-repair data regarding the vehicle after performance of the possible repair to the first vehicle and an indication that performance of the possible repair was successful; and classifying, by the computing device, the second post-repair data as an instance of successful post-repair data.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible and/or non-transitory storage medium and/or device.

Moreover, a block that represents one or more information transmissions may correspond to information transmissions between software and/or hardware modules in the same physical device. However, other information transmissions may be between software modules and/or hardware modules in different physical devices.

Numerous modifications and variations of the present disclosure are possible in light of the above teachings.

The invention claimed is:

1. A method comprising:
   receiving, by a computing device, first post-repair data regarding a first vehicle, wherein the first post-repair data is associated with a first repair order comprising first complaint data;
   comparing, by the computing device, the first post-repair data to a first set of post-repair data regarding at least one vehicle other than the first vehicle, wherein the first set of post-repair data includes at least one of an instance of successful post-repair data and an instance of non-successful post-repair data, and wherein the first set of post-repair data includes at least one instance of post-repair data associated with a repair order including complaint data that matches the first complaint data;
   determining, by the computing device, that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data; and
   outputting, by the computing device, an indication that the first repair is successful or non-successful.

2. The method of claim 1, wherein outputting the indication that the first repair is successful or non-successful comprises outputting a likelihood that the first repair is successful.

3. The method of claim 1, wherein outputting the indication that the first repair is successful or non-successful comprises outputting a likelihood that the first repair is unsuccessful.

4. The method of claim 1, wherein the first post-repair data regarding the first vehicle is received after completion of the first repair to the first vehicle and prior to the first vehicle being returned to an owner of the first vehicle after completion of the first repair to the first vehicle.

5. The method of claim 1, wherein outputting the indication that the first repair is successful or non-successful comprises outputting one or more suggested repairs to avoid a comeback.

6. The method of claim 1, further comprising:
   receiving, by the computing device, a second repair order including second complaint data and a comeback indicator; and
   determining whether the first repair to the first vehicle is successful or non-successful based on the comeback indicator.

7. The method of claim 1, further comprising:
   classifying, by the computing device, the first post-repair data as an instance of successful post-repair data in response to determining the first repair to the first vehicle is successful or as an instance of non-successful post-repair data in response to determining the first repair to the first vehicle is non-successful.

8. The method of claim 1, further comprising:
   classifying, by the computing device, the first post-repair data as an instance of potentially-successful post-repair data in response to determining the first repair to the first vehicle is successful;
   determining, by the computing device, that an indication that the first repair to the first vehicle is non-successful has not been received after a pre-determined amount of time; and
   responsively reclassifying, by the computing device, the first post-repair data from an instance of potentially-successful post-repair data to an instance of successful post-repair data.

9. The method of claim 1, further comprising:
receiving, by the computing device, a first repair order associated with the first post-repair data, wherein the first repair order includes a first repair order entry including at least one of a complaint leading to the first repair, a cause leading to the first repair, and a correction indicating the first repair;
classifying, by the computing device, the first post-repair data as an instance of successful post-repair data; and
after classifying the first post-repair data as an instance of successful post-repair data, receiving, by the computing device, second post-repair data regarding the first vehicle and a second repair order associated with the second post-repair data.

10. The method of claim 9, further comprising:
reclassifying, by the computing device, the first post-repair data from an instance of successful post-repair data to an instance of non-successful post-repair data based on the second repair order.

11. The method of claim 10, wherein reclassifying the first post-repair data is conditioned on receiving the second repair order within a predetermined amount of time after receiving the first repair order.

12. The method of claim 10, wherein the second repair order includes a comeback indicator, and wherein reclassifying the first post-repair data from an instance of successful post-repair data to an instance of non-successful post-repair data based on the second repair order comprises:
determining whether the comeback indicator indicates the second repair order is a comeback repair; and
after determining that the comeback indicator indicates that the second repair order is a comeback repair, reclassifying the first post-repair data from an instance of successful post-repair data to an instance of non-successful post-repair data based on the second repair order.

13. The method of claim 10, further comprising:
determining that the second post-repair data is successful post-repair data; and
reclassifying at least the first repair order based on the second post-repair data.

14. The method of claim 9, further comprising:
comparing, by the computing device, the second post-repair data to a second set of post-repair data regarding at least one vehicle other than the first vehicle, wherein the second set of post-repair data includes at least one of an instance of successful post-repair data and an instance of non-successful post-repair data;
determining, by the computing device, that a second repair to the first vehicle is successful if the second post-repair data matches an instance of the successful post-repair data within the second set of post-repair data or that the second repair to the first vehicle is non-successful if the second post-repair data matches an instance of the non-successful post-repair data within the second set of post-repair data; and
outputting, by the computing device, an indication that the second repair is successful or non-successful.

15. The method of claim 1, wherein the first post-repair data includes data selected from the group consisting of: (i) serial data from an electronic control unit within the first vehicle, (ii) electrical measurement data from an electrical meter connected to the first vehicle, (iii) a graphical waveform from an oscilloscope connected to the first vehicle, and (iv) an On-Board Diagnostics II (OBD II) Parameter ID (PID).

16. The method of claim 1, wherein the computing device determines the first repair to the first vehicle is non-successful and outputs an indication the first repair is non-successful, and the method further comprises:
determining, by the computing device, a second instance of successful post-repair data that is associated with the first instance of non-successful post-repair data, wherein the first instance of the non-successful post-repair data is associated with a first repair order and the second instance of successful post-repair data is associated with a second repair order, and wherein each of the first repair order and the second repair order recite a common complaint; and
outputting, by the computing device, a repair listed on the second repair order.

17. The method of claim 16, further comprising:
receiving, by the computing device, second post-repair data regarding the first vehicle;
comparing, by the computing device, the second post-repair data to post-repair data associated with the second repair order;
determining, by the computing device, the second post-repair data matches the post-repair data associated with the second repair order; and
outputting, by the computing device, an indication that performing the repair listed on the second repair order to the first vehicle is successful.

18. The method of claim 1, wherein outputting the indication includes outputting an indication that the repair is non-successful, and the method further comprising:
determining, by the computing device, a possible repair to the first vehicle;
outputting, by the computing device, the possible repair to the first vehicle;
receiving, by the computing device, second post-repair data regarding the vehicle after performance of the possible repair to the first vehicle and an indication that performance of the possible repair was successful; and
classifying, by the computing device, the second post-repair data as an instance of successful post-repair data.

19. A computing device, comprising:
a processor; and
a computer readable medium configured to store at least executable instructions, wherein the executable instructions, when executed by the processor, cause the computing device to perform functions comprising:
receiving first post-repair data regarding a first vehicle, wherein the first post-repair data is associated with a first repair order comprising first complaint data,
comparing the first post-repair data to a first set of post-repair data regarding at least one vehicle other than the first vehicle, wherein the first set of post-repair data includes at least one of an instance of successful post-repair data and an instance of non-successful post-repair data, and wherein the first set of post-repair data includes at least one instance of post-repair data associated with a repair order including complaint data that matches the first complaint data,
determining that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data, and outputting an indication that the first repair is successful or non-successful.

20. The computing device of claim 19, wherein outputting the indication that the first repair is successful or non-successful comprises outputting one or more suggested repairs to avoid a comeback.

21. A non-transitory computer readable medium configured to store at least executable instructions, wherein the executable instructions, when executed by a processor of a computing device, cause the computing device to perform functions comprising:

receiving first post-repair data regarding a first vehicle, wherein the first post-repair data is associated with a first repair order comprising first complaint data;

comparing the first post-repair data to a first set of post-repair data regarding at least one vehicle other than the first vehicle, wherein the first set of post-repair data includes at least one of an instance of successful post-repair data and an instance of non-successful post-repair data, and wherein the first set of post-repair data includes at least one instance of post-repair data associated with a repair order including complaint data that matches the first complaint data;

determining that a first repair to the first vehicle is successful if the first post-repair data matches a first instance of successful post-repair data within the first set of post-repair data or that the first repair to the first vehicle is non-successful if the first post-repair data matches a first instance of non-successful post-repair data within the first set of post-repair data; and outputting an indication that the first repair is successful or non-successful.

22. The non-transitory computer readable medium of claim 21, wherein outputting the indication that the first repair is successful or non-successful comprises outputting one or more suggested repairs to avoid a comeback.

* * * * *